(12) United States Patent
Pahwa et al.

(10) Patent No.: US 11,355,112 B1
(45) Date of Patent: Jun. 7, 2022

(54) SPEECH-PROCESSING SYSTEM

(71) Applicant: Amazon Technologies, Inc., Seattle, WA (US)

(72) Inventors: Kunal Dewan Pahwa, Seattle, WA (US); Patrick Sheehy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 119 days.

(21) Appl. No.: 16/807,832

(22) Filed: Mar. 3, 2020

(51) Int. Cl.
| G10L 15/22 | (2006.01) |
| G10L 15/08 | (2006.01) |
| G10L 13/08 | (2013.01) |
| G06N 3/08 | (2006.01) |
| G06F 3/16 | (2006.01) |

(52) U.S. Cl.
CPC ............. G10L 15/22 (2013.01); G06F 3/167 (2013.01); G06N 3/08 (2013.01); G10L 13/08 (2013.01); G10L 15/083 (2013.01); *G10L 2015/088* (2013.01); *G10L 2015/223* (2013.01)

(58) Field of Classification Search
CPC ....... G10L 15/22; G10L 15/083; G10L 13/08; G10L 2015/088; G10L 2015/223; G06F 3/167; G06N 3/08
USPC ........................................................ 704/275
See application file for complete search history.

(56) References Cited

U.S. PATENT DOCUMENTS

| 9,875,081 | B2 * | 1/2018 | Meyers | .................. | G10L 15/00 |
| 10,074,369 | B2 * | 9/2018 | Devaraj | ................ | H04L 67/306 |
| 10,762,896 | B1 * | 9/2020 | Yavagal | ................ | G10L 15/183 |
| 10,777,189 | B1 * | 9/2020 | Fu | ............... | G10L 15/22 |
| 10,825,451 | B1 * | 11/2020 | Yavagal | ................ | G10L 15/063 |
| 10,847,149 | B1 * | 11/2020 | Mok | ........................ | G10L 15/08 |
| 10,997,491 | B2 * | 5/2021 | Yao | ........................ | G06N 3/006 |
| 11,024,290 | B2 * | 6/2021 | Mitchell | ................ | G10L 15/08 |

* cited by examiner

*Primary Examiner* — Susan I McFadden
(74) *Attorney, Agent, or Firm* — Pierce Atwood LLP

(57) ABSTRACT

A system may include first and second speech-processing systems with corresponding first and second wakewords. An utterance may contain two or more wakewords. The system determines which speech-processing system to use to perform further audio processing and to determine a response to the utterance.

20 Claims, 14 Drawing Sheets

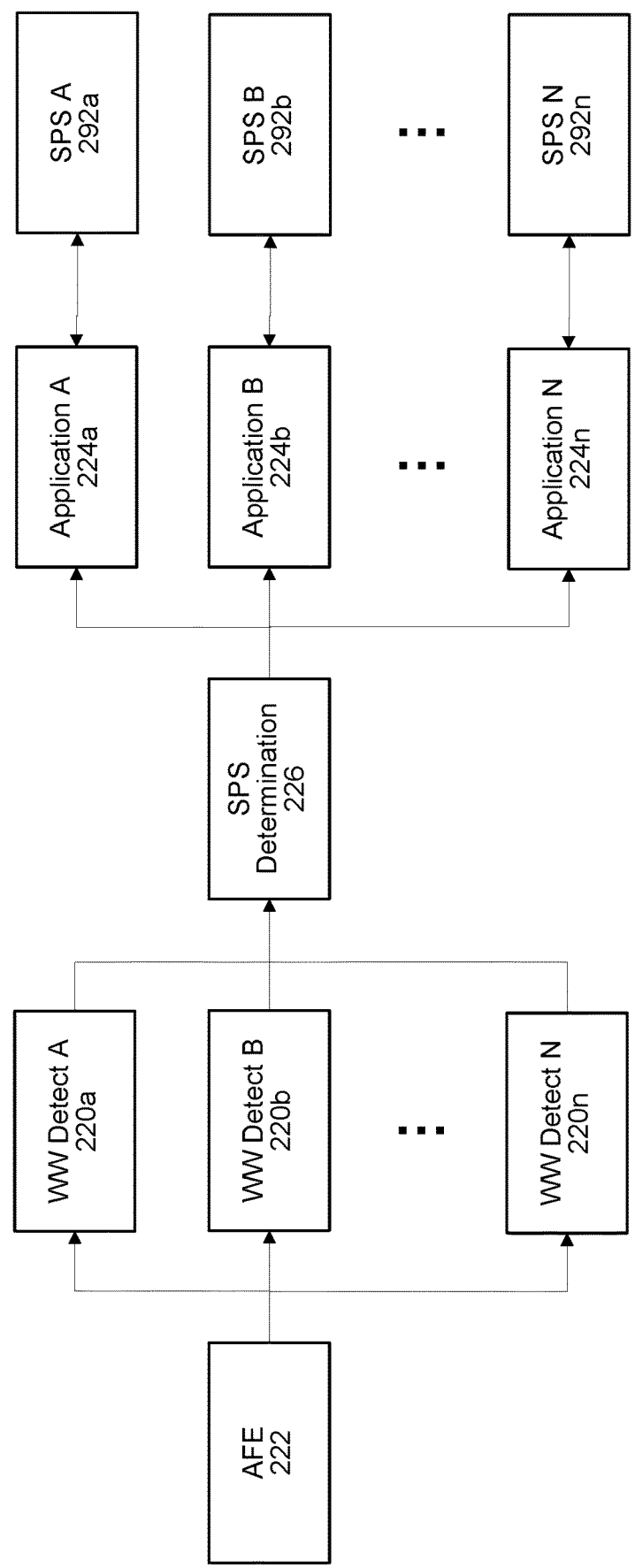

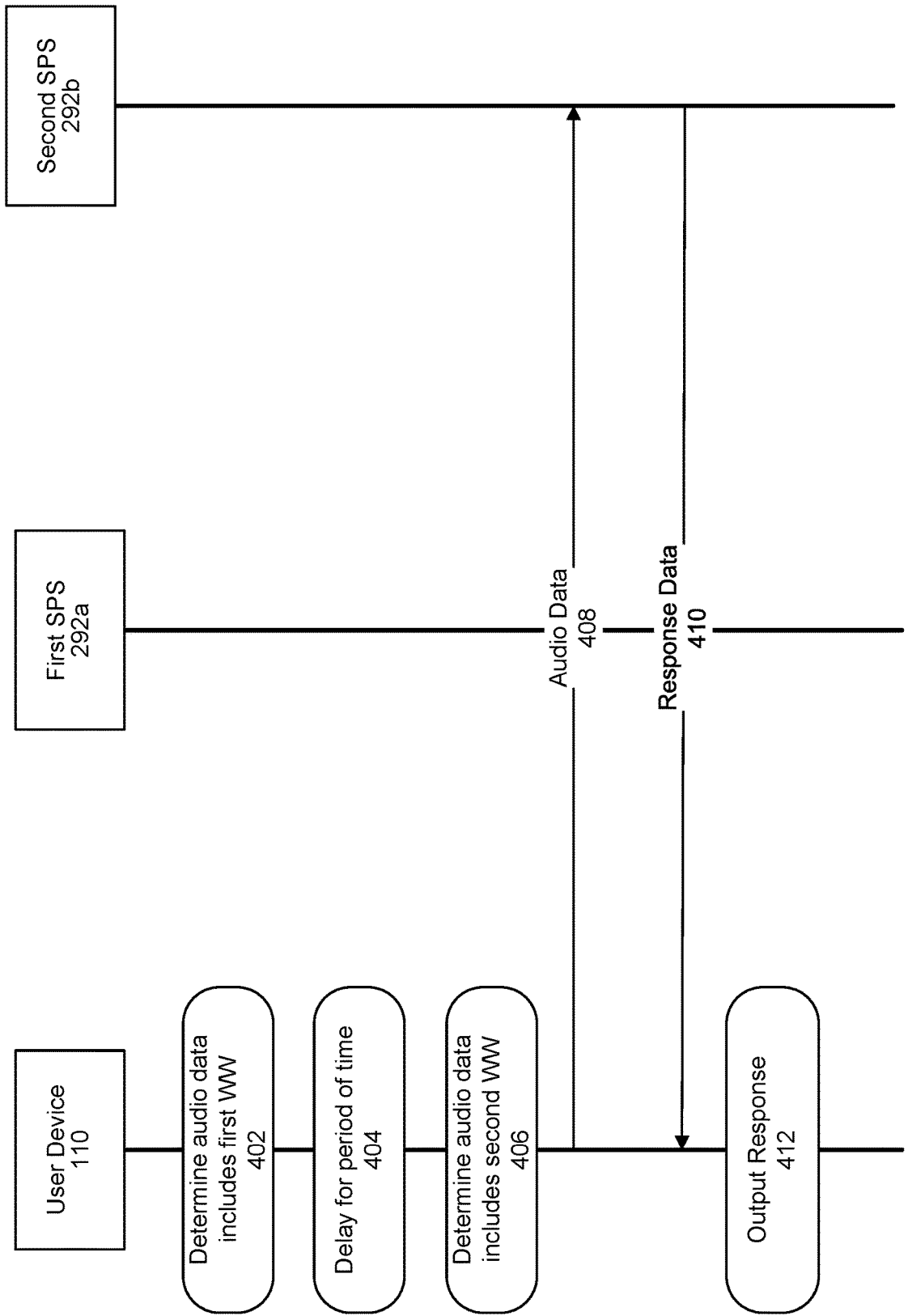

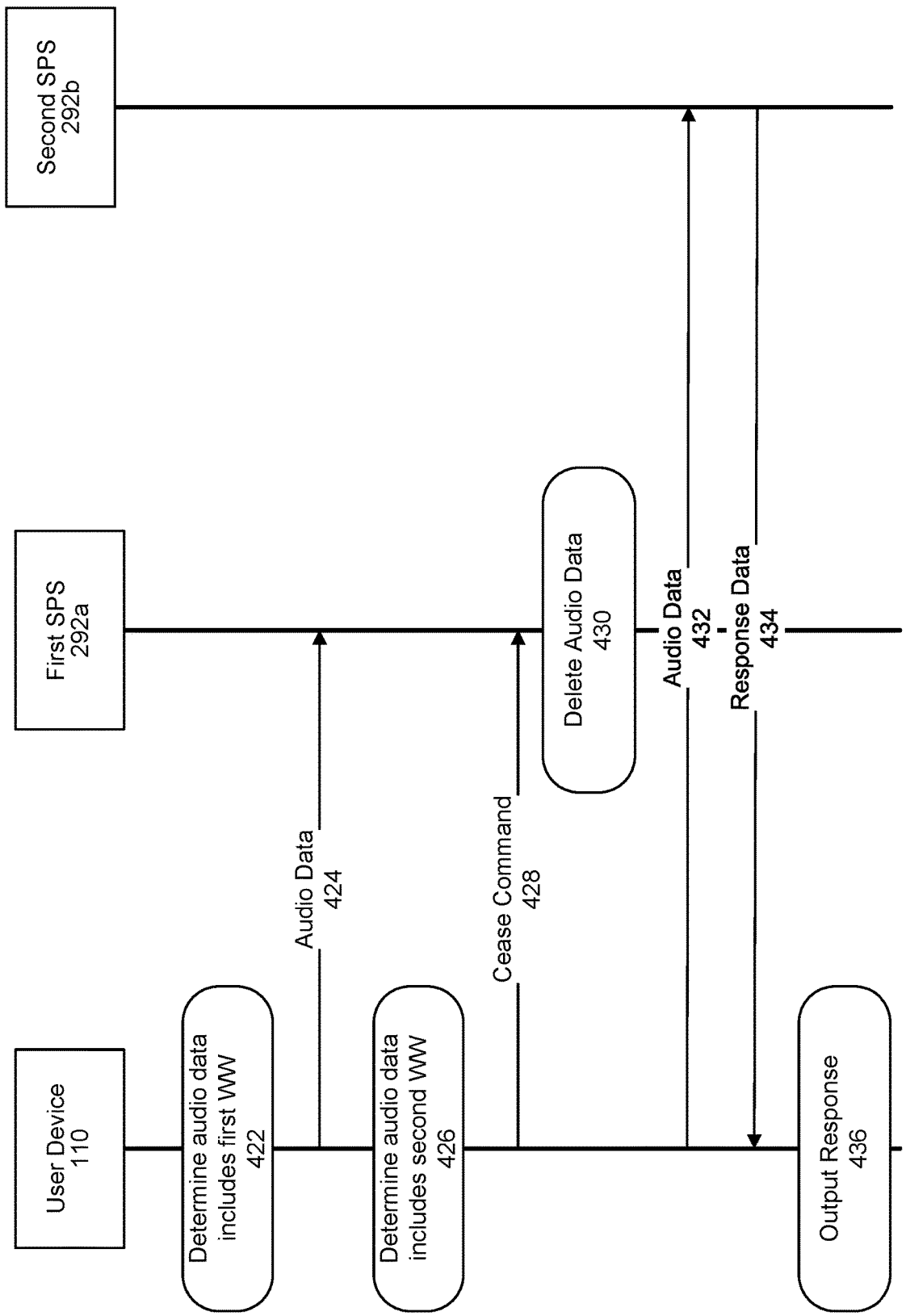

SPEECH-PROCESSING SYSTEM

BACKGROUND

Speech-processing systems allow users to control computing devices using their speech. These systems identify words spoken by a user based on properties of received audio data that represents the speech of the user. Automatic speech-recognition (ASR) processing combined with natural-language understanding (NLU) processing allows a speech-processing system to determine text corresponding to the speech and to understand an intent expressed in the text. ASR processing and NLU processing may be combined with text-to-speech (TTS) processing, which may be used to generate synthesized speech responsive to the human speech. Speech processing may be used by computers, hand-held devices, smart speakers, and other devices to improve human-computer interactions.

BRIEF DESCRIPTION OF DRAWINGS

For a more complete understanding of the present disclosure, reference is now made to the following description taken in conjunction with the accompanying drawings.

FIGS. 3A, 3B, and 3C illustrate speech-processing systems according to embodiments of the present disclosure.

FIGS. 4A and 4B illustrate methods of using speech-processing systems according to embodiments of the present disclosure.

DETAILED DESCRIPTION

Figure 1:
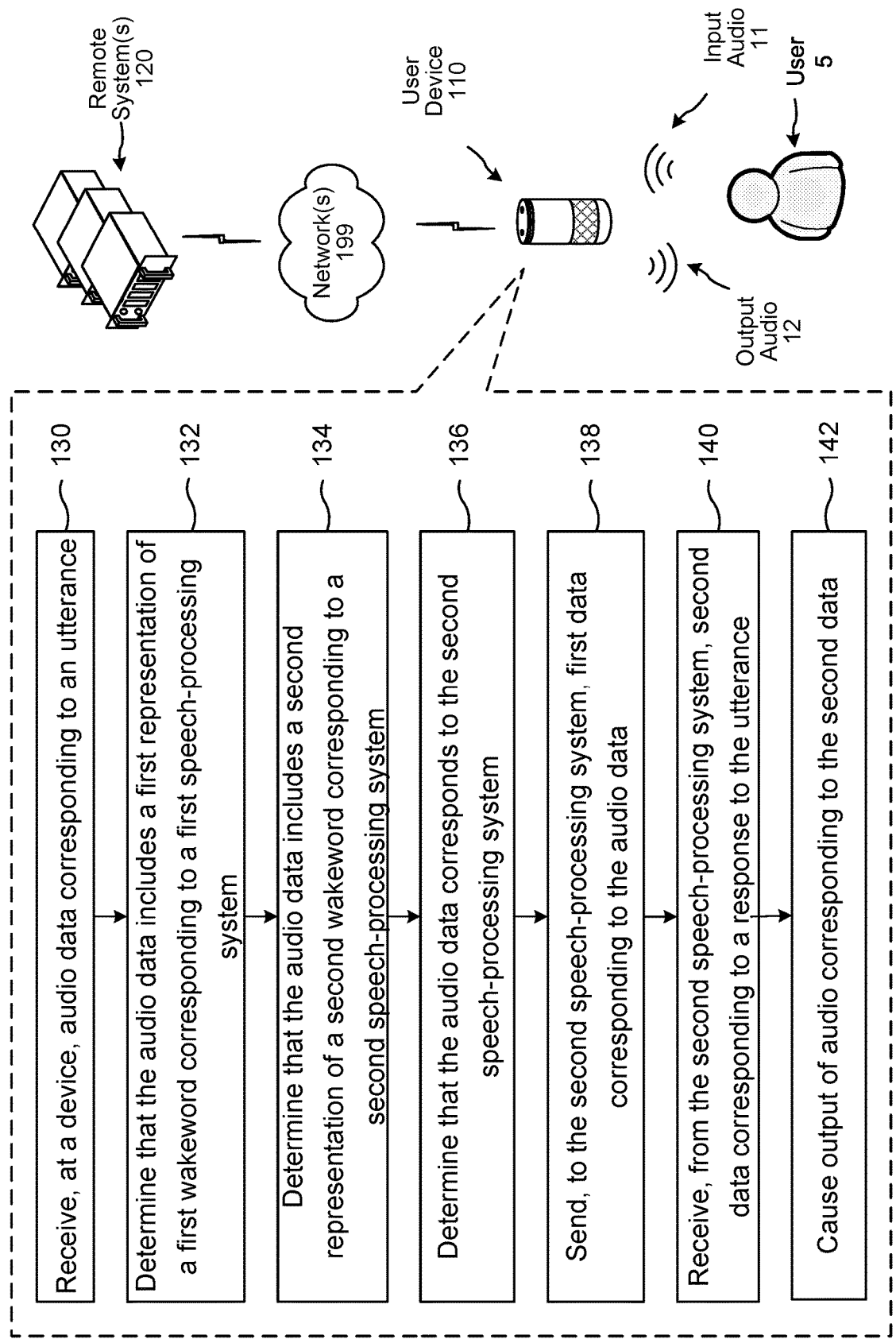
FIG. 1 illustrates a system configured to process user input using speech-processing systems according to embodiments of the present disclosure.

Automatic-speech recognition (ASR) is a field of computer science, artificial intelligence, and linguistics that relates to transforming audio data representing speech into text data representing that speech. Natural-language understanding (NLU) is a field of computer science, artificial intelligence, and linguistics that relates to enabling computers to derive meaning from the text data. Natural-language generation (NLG) is a field of computer science, artificial intelligence, and linguistics that relates to enabling computers to generate output text data responsive to input text data, such as a response to a command. Text-to-speech (TTS) is a field of computer science, artificial intelligence, and linguistics that relates to enabling computers to convert a representation of text into audio representing synthesized speech. ASR, NLU, NLG, and/or TTS may be used together as part of a natural-understanding system, which may also be referred to as a speech-processing system.

A voice-controlled user device and/or a remote system may be configured to receive a spoken user input and detect a wakeword and/or other text in the user input; determine a command in the user input; and provide a response to the command. A user may thus interact with the voice-controlled user device, another user device, and/or remote system by voice. In some embodiments, in response to the user device detecting the wakeword, the user device may send audio data, representing the speech of the user, to the remote system for further processing. The remote system may further process the audio data to verify that it includes a representation of the wakeword and/or to determine the command and/or response. The user device may then receive, from the remote device, output audio, video, or other data related to the response and/or other data required to perform an action associated with the response (e.g., a command to turn on a light).

The voice-controlled user device and/or remote system may process user input using two or more speech-processing systems, each of which may have its own ASR component(s), NLU component(s), NLG component(s), and/or TTS component(s). Each speech-processing system may be associated with commands and/or responses to those commands unique to that speech-processing system. For example, a user may prefer a first speech-processing system for online shopping and a second speech-processing system for navigation. The user may thus wish to direct online-shopping commands to the first speech-processing system and wish to direct navigation commands to the second speech-processing system. The first speech-processing system may be unable to fulfill some or all commands associated with the second speech-processing system, and vice versa. Both speech-processing systems may, however, be capable of fulfilling other commands.

Each speech-processing system may further be associated with a different wakeword. A first speech-processing system may, for example, be associated with a first wakeword "Alexa." The user device and/or remote system may be configured to use the first speech-processing system upon detection of this first wakeword. The user device and/or remote system may recognize more than one wakeword, and different wakewords may be associated with different speech-processing systems. For example, the user device and/or remote system may also be configured to recognize a second wakeword, "SmartCar," and to perform an action, such as lowering a window of an automobile, in response to speech from a user including "SmartCar, roll down my window." In this example and throughout the present disclosure, the wakeword "SmartCar" is used to represent a second wakeword corresponding to a second speech-processing system (in this example, one associated with an automobile). This second speech-processing system may be capable of performing automobile-specific actions, such as raising/lowering car windows, adjusting car seats, etc., that the first speech-processing system cannot perform. The present disclosure is not, however, limited to only this wakeword (or to only the "Alexa" wakeword) nor to only automobiles. For example, a phone or Echo-like device may have multiple wakeword functionality and/or be able to leverage two or more speech processing systems and/or components thereof (e.g., different TTS and natural language generation components that can give the user a perception of different artificial "personalities"). The present disclosure is further not limited to use of multiple speech-processing systems on a single device; a first user device may have one or more first speech-processing systems, a second user device may have one or more second speech-processing systems, and so on.

In some situations, however, a user may issue an utterance that includes two or more different wakewords that are each associated with two or more different speech-processing systems. The user may have intended that the utterance be processed using a second speech-processing system but, in some instances, the user device may, upon detection of both a first wakeword and a second wakeword, send audio data corresponding to the utterance to the first speech-processing system. The first speech-processing system may not be capable of determining a response and/or causing related actions to be taken. Even if the first speech-processing system is so capable, the user may have preferred that the response be determined by the second speech-processing system.

For example, the utterance may be, "Alexa, I mean SmartCar, roll down my window." The user device may thus detect the wakeword Alexa and cause processing of associated audio data by a speech-processing system associated with the wakeword "Alexa." The user, however, intended to direct the utterance to the second speech-processing system corresponding to the wakeword "SmartCar." The Alexa speech-processing system may not be capable of causing performance of the command in the utterance (here, rolling down a car window). Similarly, the utterance may be, "SmartCar, er . . . Alexa, when is my next appointment?" The user device may similarly cause further processing of this utterance by the SmartCar speech-processing system, which may not be able to access the relevant calendar of the user. And even if either system may be able to process the command, in some embodiments, the user's intent governs which system processes the audio, saves any historical data related to the interaction, and/or responds according to its unique configuration.

In various embodiments of the present disclosure, therefore, the user device determines that audio data representing an utterance includes a representation of more than one wakeword and then determines which associated speech-processing system should process the audio data to determine the response. The user device then sends corresponding data to that speech-processing system and optionally receives a response to output.

FIG. 1 illustrates a system configured to select between two or more speech-processing systems to use to determine a response to a command represented in audio data, in accordance with the present disclosure. Although the figures and discussion of the present disclosure illustrate certain operational steps of the system in a particular order, the steps described may be performed in a different order (as well as certain steps removed or added) without departing from the intent of the disclosure. In various embodiments, a user device 110 such as smart speaker, a vehicle such as an automobile, or other such voice-controlled device communicates with a remote system 120 using a network 199. While FIG. 1 illustrates a smart speaker as the user device 110, the disclosure is not limited thereto, and the systems and methods described herein may be implemented using other user devices 110, such as smartphones, tablet computers, personal computers, or other devices.

The user device 110 receives (130) audio data corresponding to an utterance. The user device 110 may, for example, determine that input audio 11 includes a representation of a single wakeword and send corresponding input audio data 211 to the remote system 120 via the network 199. To accomplish this determination, the user device 110 may capture audio using one or more microphones and process this audio using one or more acoustic front-end (AFE) components. Each AFE component may create corresponding audio data, which may be a time-domain digital representation of amplitudes of the audio and which may be represented as a series of samples. The user device 110 may process this time-domain audio data to create processed audio data; this processing may, for example, include performing one or more Fourier transforms, such as a fast Fourier transform (FFT) and/or grouping samples of audio data into frames of audio data. The AFE may perform additional processing, such as acoustic echo cancellation (AEC), acoustic noise reduction (ANR), and/or beamforming.

The user device 110 may include one or more wakeword detector(s) 220 (as explained in greater detail below with respect to FIGS. 2A and 2B) that process the frames of audio data to determine if a wakeword is represented therein. The input audio data 211 may include a representation of the wakeword and/or a representation of other words than include the command. The user device 110 may determine additional data, such as a time of detection of the wakeword and/or an indication of which wakeword was detected. The user device 110 may thus first determine (132) that the audio data includes a first representation of a first wakeword corresponding to a first speech-processing system.

As mentioned above, however, the user device 110 may further determine (134) that the audio data includes a second representation of a second wakeword corresponding to a second speech-processing system. For example, the user 5 may mistakenly utter the first wakeword and then, as a correction, utter the second wakeword. In some embodiments, upon detection of the first wakeword, the user device 110 may wait for a period of time, such as 500 milliseconds, before taking further action (e.g., sending the audio data to the first speech-processing system) to further process the audio data to determine if it also includes a representation of the second (or other) wakeword. In other embodiments, the user device 110 begins sending audio data to the first speech-processing system upon detection of the first wakeword, and if it then (a) detects the second wakeword and (b) determines that the audio data should be processed by the second speech-processing system, cause the first speech-processing system to cease further processing of the audio data (by, for example, sending data corresponding to a command to cease processing).

The user device 110 may thus determine (136) that the audio data corresponds to the second speech-processing system, despite detecting the first wakeword of the first speech-processing system. This determination may be made by determining that a representation of the second wakeword appears in the audio data at a later time with respect to a representation of the first wakeword. That is, the user 5 uttered the first wakeword first and then, after uttering the first wakeword, uttered the second wakeword. In various embodiments, if the user utters a first wakeword and then a second, different wakeword, the user device determines that the utterance of the second wakeword is intended to correct and replace the utterance of the first wakeword. Selecting the speech-processing system associated with the later-uttered wakeword thus matches the intention of the user 5.

In some embodiments, instead of or in addition to using the timing of the wakewords to determine the speech-processing system, further processing may be performed on the audio data and/or text data corresponding thereto to determine and/or confirm the selected speech-processing system. For example, a model, such as a classifier, trained neural network, and/or finite state transducer, may process the text data to determine a domain of the command; the user device 110 may then select a speech-processing system that corresponds to the domain and/or verify that the already-selected speech-processing system corresponds to the domain.

The user device 110 may then send (138), to the second speech processing system, first data corresponding to the audio data; the first data may be or include the audio data and/or a further-processed version of the audio data. For example, the user device 110 may encrypt the audio data to generate the first data. The second speech-processing system may then process the first data using the ASR and/or NLU techniques described herein, determine a response based on a determined domain, intent, and/or entity using, for example, a natural-language generation (NLG) component, and/or determine response data using TTS techniques. The user device 110 may then receive (140), from the second speech-processing system, second data corresponding to the response and cause (142) output 12 corresponding to the second data.

Figure 2:
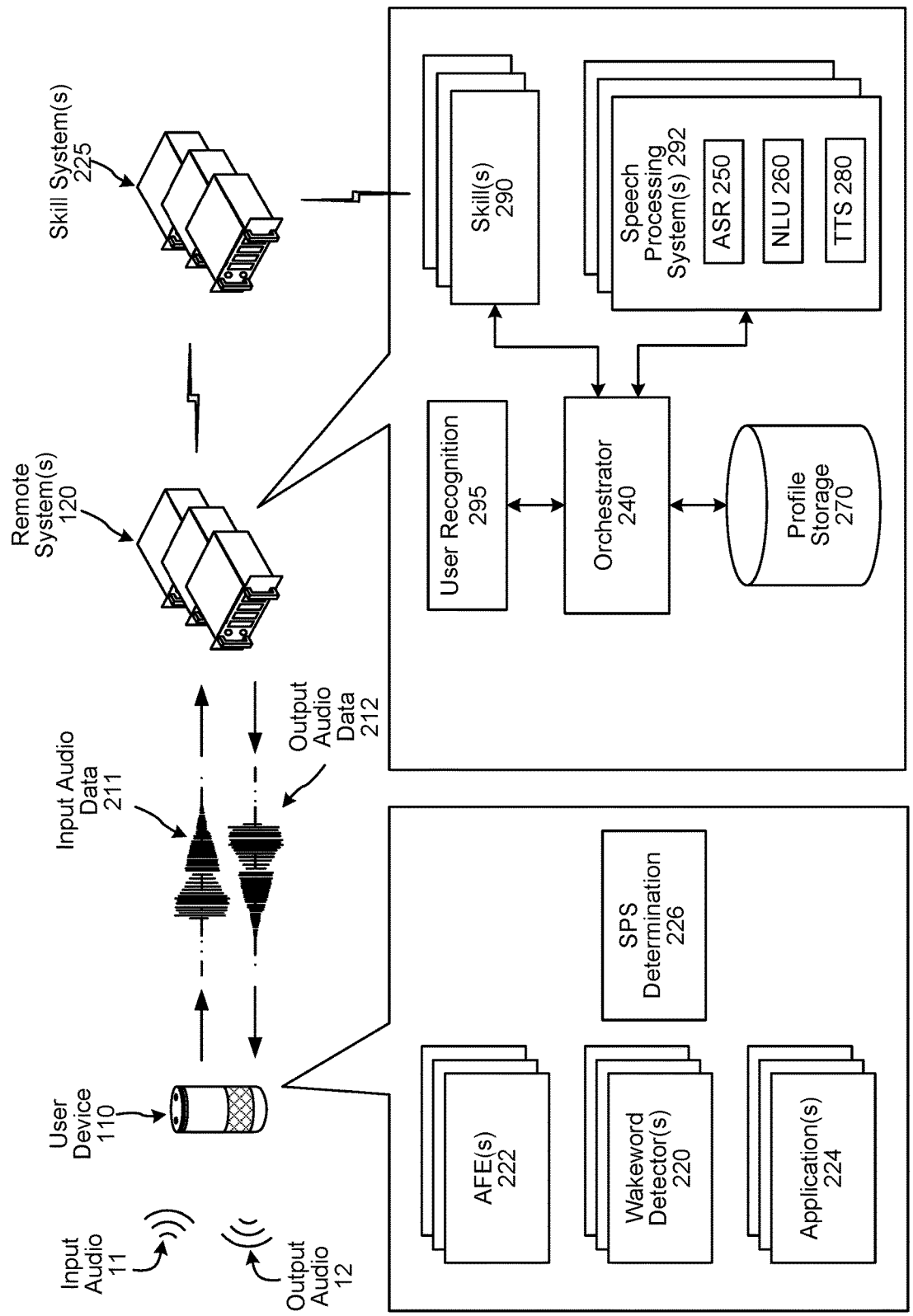
FIG. 2 illustrates a user device and a remote system configured for speech processing according to embodiments of the present disclosure.

The system may operate using various components as described in FIG. 2. The various components may be located on same or different physical devices. For example, as shown in FIG. 2, some components may be disposed on a user device 110, while other components may be disposed on a remote system 120; however, some or all of the components may be disposed on the user device 110. Communication between various components may thus occur directly (via, e.g., a bus connection) or across a network(s) 199. As described in greater detail below, the user device 110 may include an acoustic front end (AFE) 222 for processing audio, one or more wakeword detectors 220 for detecting one or more wakewords, and/or one or more applications 224 for providing output and/or changing a state of the user device 110, such as illuminating a light. As illustrated, the wakeword detector 220 is disposed on the user device 110, while further speech-processing components (such as the NLU component 260) are disposed on the remote system 120. The present disclosure is not, however, limited to only this arrangement of components, and any other disposition of components is within the embodiments of the present disclosure. For example, some or all of the speech-processing may be performed by the user device 110, and the user device 110 may thus not send any audio data 211 to the remote system 120.

An audio capture component(s), such as a microphone or array of microphones of the user device 110, captures input audio 11 and creates corresponding microphone data. The AFE 222 may process the microphone data using a number of techniques, such as determining frequency-domain audio data by using a transform such as an FFT, performing AEC and/or ANR, and/or by performing beamforming. The output of the AFE 222 may be, or include a representation of, the input audio data 211.

The user device 110 may process the input audio data 211 to determine whether speech is represented therein. The user device 110 may use various techniques to determine whether the input audio data 211 includes speech. In some examples, a voice-activity detector of the user device 110 may apply voice-activity detection (VAD) techniques. Such VAD techniques may determine whether speech is present in audio data based on various quantitative aspects of the input audio data 211, such as the spectral slope between one or more frames of the audio data; the energy levels of the audio data in one or more spectral bands; the signal-to-noise ratios of the audio data in one or more spectral bands; or other quantitative aspects. In other examples, the user device 110 may include a classifier configured to distinguish speech from background noise. The classifier may be implemented by techniques such as linear classifiers, support vector machines, and decision trees. In still other examples, the user device user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

The wakeword detector(s) 220 may determine that the input audio data 211 contains a representation of a first wakeword and a second wakeword (as described in greater detail below); the user device 110 may thereafter send the input audio data 211 to the system(s) 120. As described above, example wakewords are "Alexa" and "SmartCar." As described in greater detail with reference to FIGS. 3A, 3B, and 3C, the user device 110 may include one or more wakeword detector(s) 220 that recognize multiple wakewords and/or wakeword detector(s) 220 that each recognize a single wakeword. The wakeword detector 220 may be configured to recognize different wakewords, such as "Computer" instead of "Alexa," upon receipt of an input.

The wakeword detector(s) 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detector 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a first wakeword is detected by the wakeword detector(s) 220, the user device 110 may begin transmitting the audio data 211 to the remote system(s) 120. The input audio data 211 may include data corresponding to the wakeword; in other embodiments, the portion of the audio corresponding to the wakeword is removed by the user device 110 prior to sending the input audio data 211 to the remote system(s) 120. In the case of touch input detection, for example, the input audio data 211 may not include a wakeword. If a wakeword detector(s) 220 detects a second wakeword in the audio data 211, it may cause a first speech-processing system 292a to cease processing the audio data 211 and cause a second speech-processing system 292b to begin processing the audio data 211.

In various embodiments, the wakeword detector(s) 220 may use one of a plurality of wakeword-detection models. Each model may be trained to detect a different wakeword. In some embodiments, a single model may detect multiple wakewords. Each wakeword may be associated with a different speech-processing system. Upon detection of a particular wakeword, the user device 110 may send the audio data 211 (and/or an indication of detection of the wakeword) to its corresponding speech-processing system.

In various embodiments, the wakeword-detection model of the wakeword detector(s) 220 is implemented to detect wakewords spoken in different accents corresponding to different countries, regions, or other areas. For example, the wakeword-detection model may be implemented to detect the wakeword "Alexa" whether it is spoken in an Indian, Scottish, or Australian accent. The wakeword-detection model may be also implemented to detect other wakewords in other languages; these other languages may have similar variations in accents that the wakeword-detection model may be similarly implemented to detect.

The wakeword detector(s) 220 may determine a similarity score for the candidate wakeword based on how similar it is to the stored wakeword; if the similarly score is higher than the wakeword-detection threshold, the wakeword detector 220 determines that the wakeword is present in the audio data, and if the similarity score is less than the wakeword-detection threshold, the wakeword detector 220 determines that the wakeword not is present in the audio data. For example, if the candidate wakeword matches the stored wakeword very closely, the wakeword detector 220 may determine a similarity score of 100; if the candidate wakeword does not match the stored wakeword at all, the wakeword detector 220 may determine a similarity score of 0. If the wakeword detector 220 determines candidate wakeword partially matches the stored wakeword, it may determine an intermediate similarity score, such as 75 or 85. Though the disclosure herein describes a similarity score of 0-100, wherein zero is least similar and 100 is most similar. The present disclosure is not limited to any particular range of values of the similarity score, and any system or method of determining similarity between a candidate wakeword represented in captured audio data and a stored representation of the wakeword is within the scope of the present disclosure.

A speech-processing system determination component 226 may, upon detection by the wakeword detector(s) 220 of more than one wakeword in the input audio 11, determine which of a plurality of speech-processing systems 292 should be selected for further processing of the audio data. In some embodiments, the speech-processing system determination component 226 selects a speech-processing system 292 based on when in the audio data the representations of the wakewords appear. For example, the speech-processing system determination component 226 may select a speech-processing system 292 corresponding to a second wakeword that appears in the audio data after a first wakeword. A wakeword detector 220 may, for example, detect that the audio data includes a representation of the first wakeword at a first point in time, and then the same or different wakeword detector 220 may, at a second point in time later than the first point in time, detect that the audio data includes a representation of a second wakeword. Each wakeword detector 220 may, upon detection of a wakeword, send a corresponding signal to the speech-processing system determination component 226.

The speech-processing system determination component 226 may instead or in addition determine that, though the input audio data 211 includes representations of first and second wakewords, a command represented in the input audio data 211 corresponds to a second speech-processing system. The speech-processing system determination component 226 may include, for example in a computer memory, a list of speech-processing systems and associated domains, intents, and/or entities. The speech-processing system identification component may receive determined domains, intents, and/or entities from (for example) an NLU component and select a matching speech-processing system from the list. The speech-processing system determination component 226 may also or instead include a trained model, such as a classifier, that processes the audio data 211 (and/or text data determined therefrom) to output a corresponding speech-processing system.

The speech-processing system determination component 226 may compare a determined domain, intent, and/or meaning to a list of corresponding applications or skills associated with each speech-processing system 292. The comparison may include determining a number of whole or partial matches of the domain, intent, and/or meaning present in each list. The speech-processing system determination component 226 may determine a score for each speech-processing system 292 corresponding to the ability of each speech-processing system 292 to respond to a command represented in the input audio data 211. If the domain, intent, and/or meaning is determined to be associated with a first speech-processing system 292 but not with a second speech-processing system 292, the speech-processing system determination component 226 may award the first speech-processing system 292 a higher score than the second speech-processing system 292. If the domain, intent, and/or meaning is determined to be associated both the first speech-processing system 292 and the second speech-processing system 292, the speech-processing system determination component 226 may determine the ranking based on other data, such as user identification, user profile data, location, or other information.

Upon receipt by the system(s) 120 and/or upon determination by the user device 110, the input audio data 211 may be sent to an orchestrator component 240. The orchestrator component 240 may include memory and logic that enables it to transmit various pieces and forms of data to various components of the system, as well as perform other operations as described herein. The orchestrator component 240 may be or include a speech-processing system manager and/or one or more of the speech-processing systems 292, which may be used to determine which, if any, of the ASR 250, NLU 260, and/or TTS 280 components should receive and/or process the audio data 211. In some embodiments, the orchestrator component 240 includes one or more ASR components 250, NLU components 260, TTS components 280, and/or other processing components, and processes the input audio data 211 before sending it and/or other data to one or more speech-processing components 292 for further processing. In other embodiments, the orchestrator component 240 sends the input audio data 211 to one or more of the speech-processing components 292 for processing.

In some embodiments, the orchestrator 240 and/or speech-processing system manager communicate with the speech-processing systems 292 using an application programming interface (API). The API may be used to send and/or receive data, commands, or other information to and/or from the speech-processing systems 292. For example, the orchestrator 240 may send, via the API, the input audio data 211 to a speech-processing systems elected by the speech-processing system manager and may receive, from the selected speech-processing system 292, a command and/or data responsive to the audio data 211.

Each speech-processing system 292 may include an ASR component 250, which may transcribe the input audio data 211 into text data. The text data output by the ASR component 250 may represent one or more than one (e.g., in the form of an N-best list) ASR hypotheses representing speech represented in the input audio data 211. The ASR component 250 may interpret the speech in the input audio data 211 based on a similarity between the audio data 211 and pre-established language models. For example, the ASR component 250 may compare the input audio data 211 with models for sounds (e.g., acoustic units such as phonemes, senons, phones, etc.) and sequences of sounds to identify words that match the sequence of sounds of the speech represented in the input audio data 211. The ASR component 250 sends the text data generated thereby to an NLU component 260, via, in some embodiments, the orchestrator component 240. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein.

The first speech-processing system 292a may control, have access to, or otherwise be associated with a first set of skills 290, applications, and/or speech styles, and the second speech-processing system 292b may control, have access to, or otherwise be associated with a second set of skills 290, applications, and/or speech styles. The first and second set of skills 290 may include common skills as well as skills exclusive to each speech-processing system 292. In some embodiments, a first speech-processing system 292a is a general-purpose speech-processing system and may provide such skills and applications as weather forecasts, restaurant reservations, shopping services, and Internet searches; a second speech-processing system 292b is a vehicle-specific speech-processing system and may provide such skills and applications as changing a state of the user device 110 (e.g., raising/lowering a window, setting a thermostat, and/or adjusting a seat) and/or providing diagnostic information. Some applications and skills may be common to both speech-processing systems 292 (e.g., playing music or providing navigation information). Any number of speech-processing systems 292, however, having any type of applications or skills is within the scope of the present disclosure.

Figure 5:
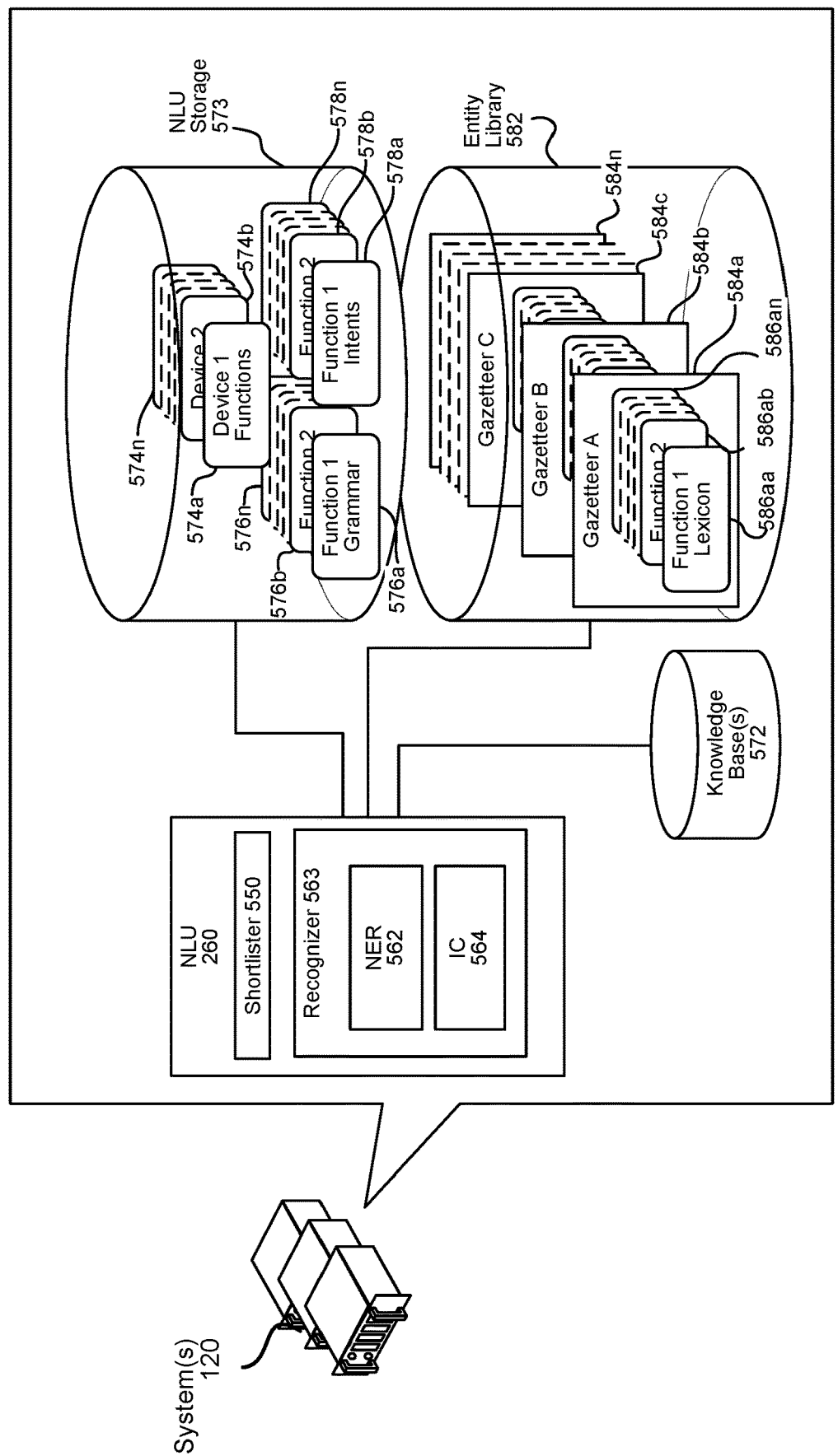
FIG. 5 illustrates a natural-language processing system according to embodiments of the present disclosure.
Figure 6:
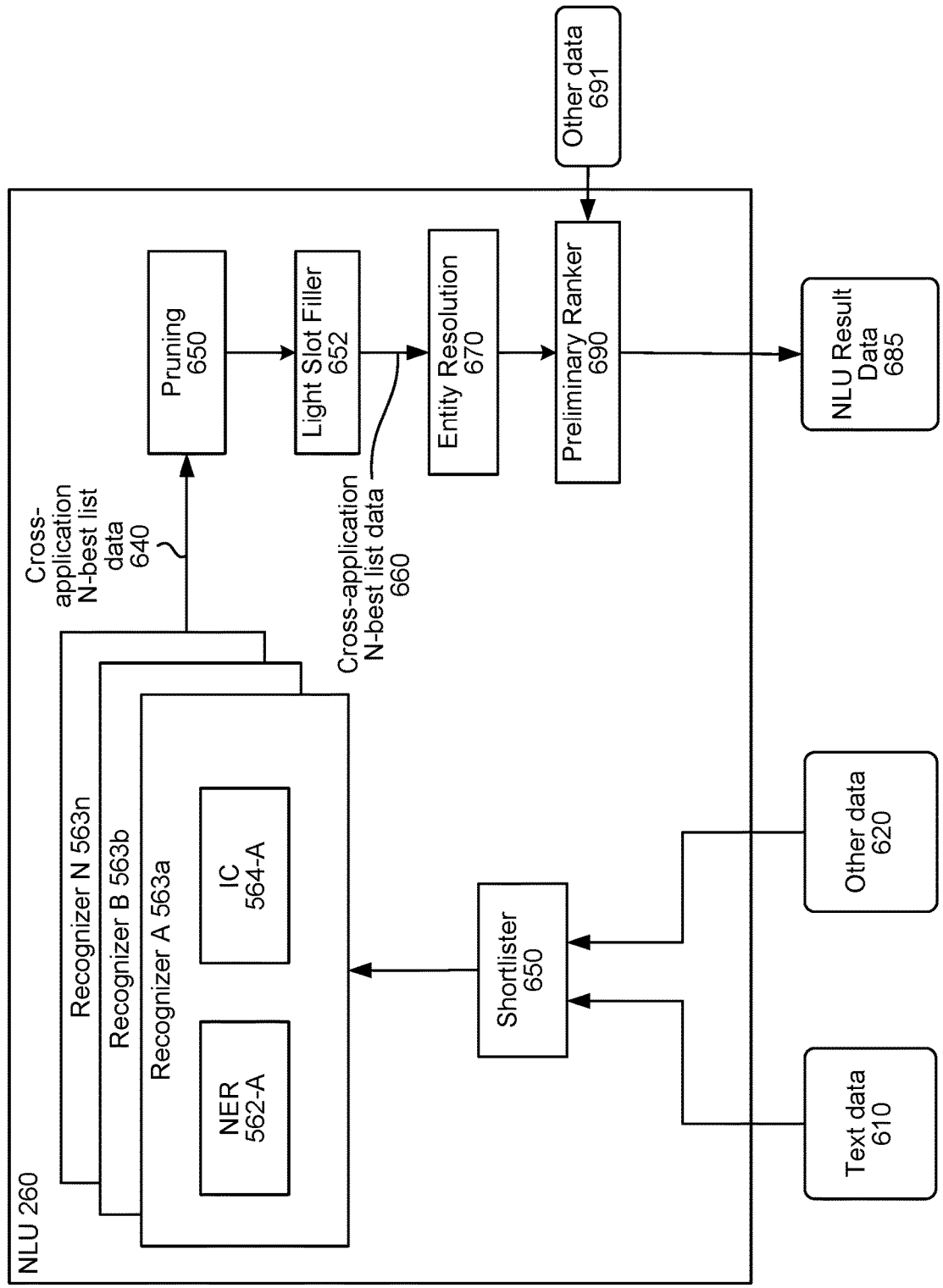
FIG. 6 illustrates components of a natural-language processing system according to embodiments of the present disclosure.

Each speech-processing system 292 may further include a NLU component 260, which is shown in greater detail in FIGS. 5 and 6, that attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the user device 110, the system(s) 120, a skill component 290, a skill system(s) 225, etc.) to execute the intent. For example, if the text data corresponds to "play Africa by Toto," the NLU component 260 may determine an intent that the system output music and may identify "Toto" as an artist and "Africa" as the song. For further example, if the text data corresponds to "what is the weather," the NLU component 260 may determine an intent that the system output weather information associated with a geographic location of the user device 110. In another example, if the text data corresponds to "turn off the lights," the NLU component 260 may determine an intent that the system turn off lights associated with the user device 110 or the user 5.

The NLU results data may be sent (via, for example, the orchestrator component 240) from the NLU component 260 (which may include tagged text data, indicators of intent, etc.) to a skill component(s) 290. If the NLU results data includes a single NLU hypothesis, the NLU component 260 may send the NLU results data to the skill component(s) 290 associated with the NLU hypothesis. If the NLU results data includes an N-best list of NLU hypotheses, the NLU component 260 may send the top scoring NLU hypothesis to a skill component(s) 290 associated with the top scoring NLU hypothesis. As described above, the NLU component 260 and/or skill component 290 may determine, using the interaction score, text data representing an indication of a handoff from one speech-processing system 292 to another.

A skill component 290 may be software running on the system(s) 120 that is, or is similar to, a software application. A skill component 290 may enable the system(s) 120 to execute specific functionality in order to provide data or produce some other requested output. The system(s) 120 may be configured with more than one skill component 290. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 290 may operate in conjunction between the system(s) 120 and other devices, such as the user device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill system(s) 225 may communicate with a skill component(s) 290 within the system(s) 120 directly and/or via the orchestrator component 240. A skill system(s) 225 may be configured to perform one or more actions. A skill may enable a skill system(s) 225 to execute specific functionality in order to provide data or perform some other action requested by a user. For example, a weather service skill may enable a skill service(s) 225 to provide weather information to the system(s) 120, a car service skill may enable a skill system(s) 225 to book a trip with respect to a taxi or ride sharing service, an order pizza skill may enable a skill system(s) 225 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill. The system(s) 120 may include a skill component 290 dedicated to interacting with the skill system(s) 225. A skill, skill device, or skill component may include a skill component 290 operated by the system(s) 120 and/or skill operated by the skill system(s) 225.

Figure 7:
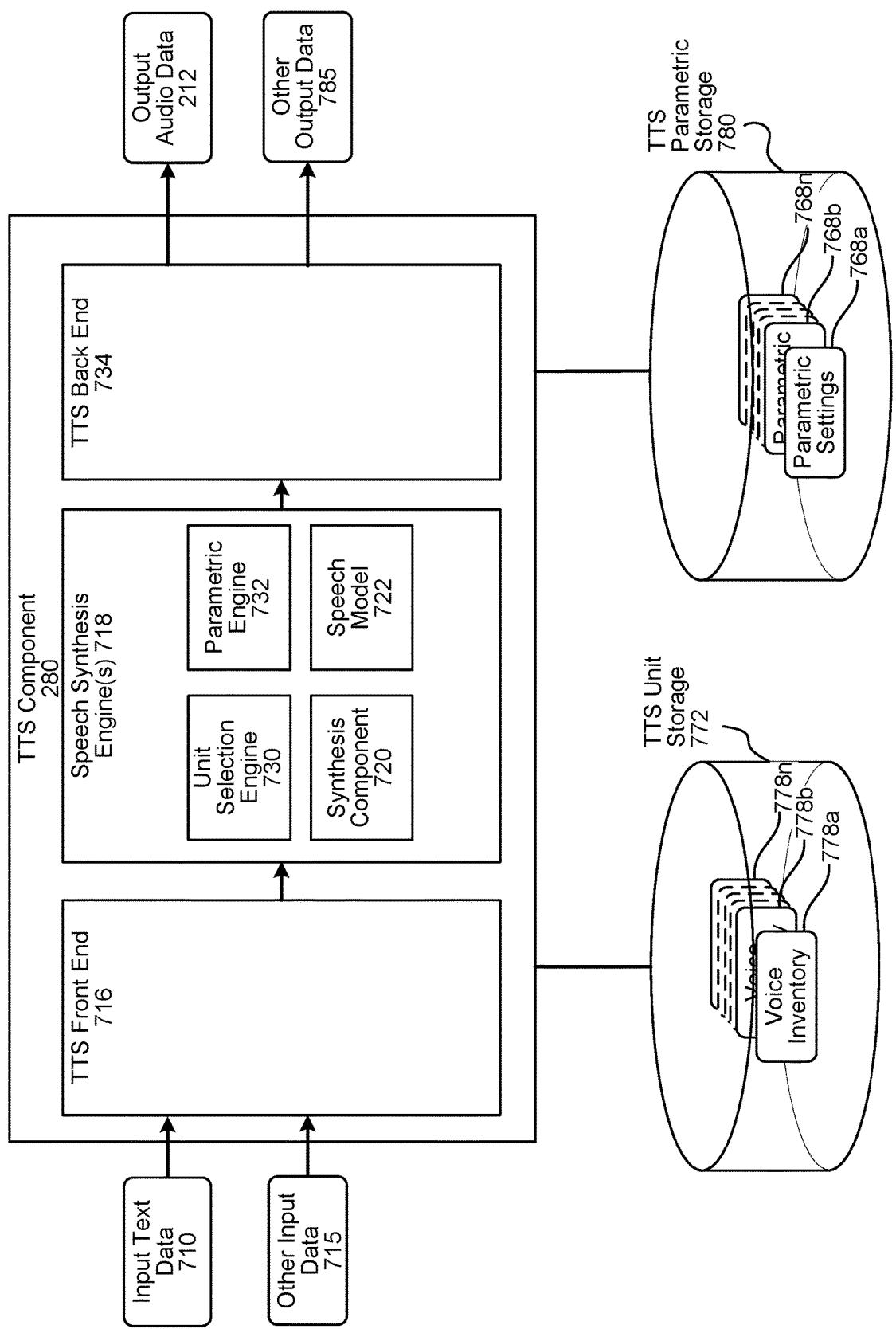
FIG. 7 illustrates text-to-speech processing components according to embodiments of the present disclosure.

The speech-processing system 292 may include a TTS component 280, which is shown in greater detail in FIG. 7, that generates audio data (e.g., synthesized speech) from text data using one or more different methods. Text data input to the TTS component 280 may come from a skill component 290, the orchestrator component 240, and/or another component of the system. The text data may include an indication of a speech-processing component and/or data responsive to a command.

Figure 8:
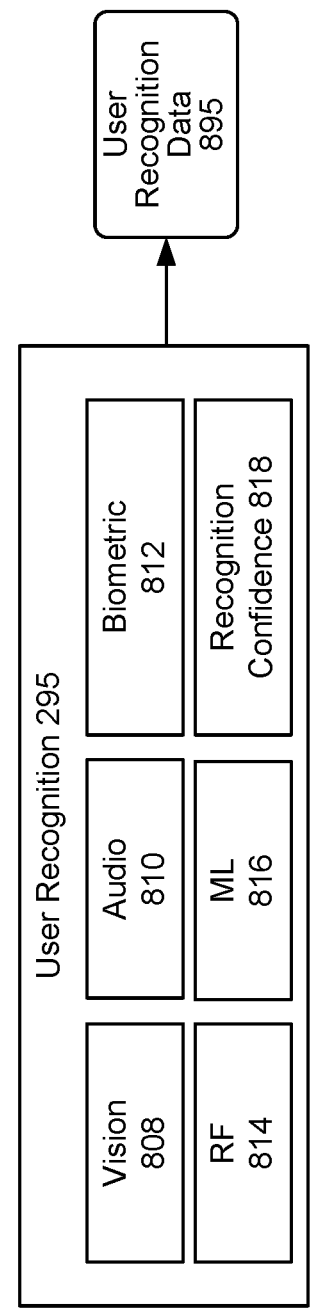
FIG. 8 illustrates a user-recognition component according to embodiments of the present disclosure.

The system(s) 120 may include a user-recognition component 295, which is shown in greater detail in FIG. 8, that recognizes one or more users associated with data input to the system. The user-recognition component 295 may take as input the audio data 211 and/or text data output by the ASR component 250. The user-recognition component 295 may perform user recognition by comparing audio characteristics in the input audio data 211 to stored audio characteristics of users. The user-recognition component 295 may also perform user recognition by comparing biometric data (e.g., fingerprint data, iris data, etc.), received by the system in correlation with the present user input, to stored biometric data of users. The user-recognition component 295 may further perform user recognition by comparing image data (e.g., including a representation of at least a feature of a user), received by the system in correlation with the present user input, with stored image data including representations of features of different users. The user-recognition component 295 may perform additional user recognition processes, including those known in the art.

The user-recognition component 295 determines scores indicating whether user input originated from a particular user. For example, a first score may indicate a likelihood that the user input originated from a first user, a second score may indicate a likelihood that the user input originated from a second user, etc. The user-recognition component 295 also determines an overall confidence regarding the accuracy of user recognition operations.

Output of the user-recognition component 295 may include a single user identifier corresponding to the most likely user that originated the user input. Alternatively, output of the user-recognition component 295 may include an N-best list of user identifiers with respective scores indicating likelihoods of respective users originating the user input. The output of the user-recognition component 295 may be used to inform NLU processing as well as processing performed by other components of the system.

The system(s) 120 may include profile storage 270. The profile storage 270 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier. Each user profile may include various user identifying information. Each user profile may also include preferences of the user and/or one or more device identifiers, representing one or more devices of the user. When a user logs into to an application installed on a user device 110, the user profile (associated with the presented login information) may be updated to include information about the user device 110. As described, the profile storage 270 may further include data that shows an interaction history of a user, including commands and times of receipt of commands. The profile storage 270 may further include data that shows when a second user was present to hear an indication of a handoff for a command uttered by a first user.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system 120 may be configured to incorporate user permissions and may only perform activities disclosed herein if approved by a user. As described above, these permissions may include a grant (or denial) to use a particular speech-processing system 292. The systems, devices, components, and techniques described herein may thus be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 3A:
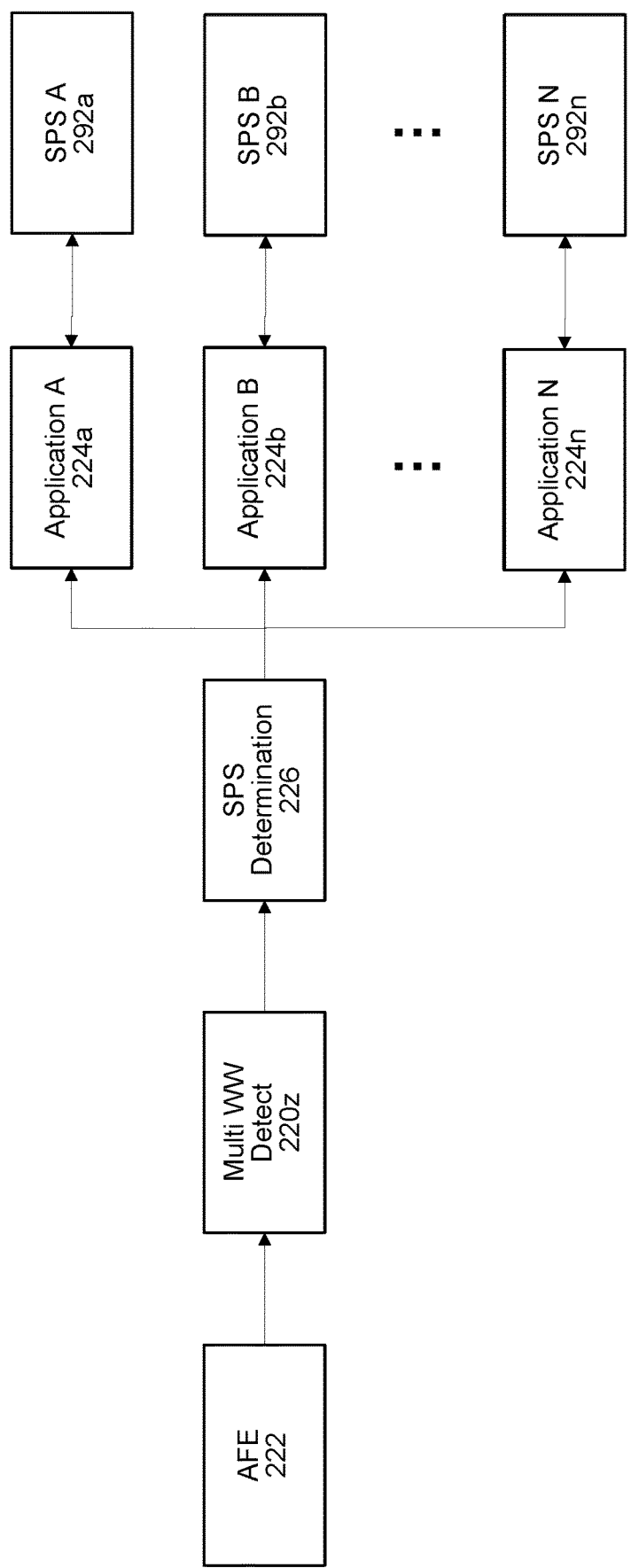
Figure 3C:
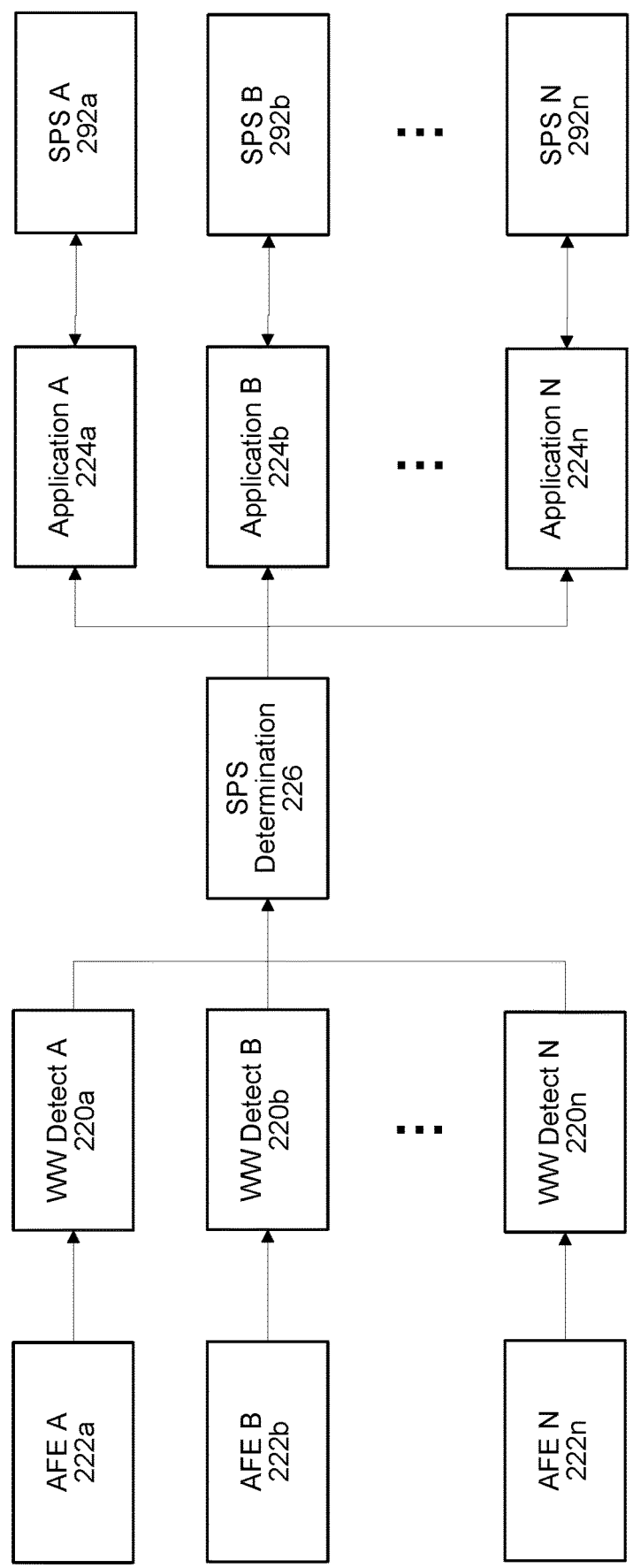

FIGS. 3A, 3B, and 3C illustrate systems for processing speech in accordance with embodiments of the present invention. Referring first to FIG. 3A, an AFE 222 may receive data from one or more microphones and, as described above, process that data to determine audio data. That processing may include transforming the data into frequency-domain data (using, for example, an FFT), dividing the data into two or more frequency bins, cancelling or reducing echoes using AEC, suppressing noise using ANR, beamforming, and/or re-combining the frequency bins after processing and converting the frequency data back into time-domain data. Any kind or representation of audio data, which may include some representation of an utterance, is within the scope of the present disclosure.

The output of the AFE 222 may be processed with a multi-wakeword detector 220z. The multi-wakeword detector 220z may be a trained model, as described above, that processes audio data to determine if and when it includes a representation of one of multiple wakewords. When the multi-wakeword detector 220z detect a wakeword, it may output data that indicates that a wakeword was detected, which wakeword was detected, and/or time data indicating when the wakeword was detected.

The speech-processing system determination component 226 may then, as described above, select a speech-processing system 292 based on the output(s) of the multi-wakeword detector 220z. The selection of the speech-processing system 292 may be determined, as also described above, by determining which of a plurality of wakewords represented in the audio data appears last in the audio data. The selection of the speech-processing system 292 also or instead be determined by processing the audio data using, e.g., a trained model and/or NLU component, to determine which speech-processing system 292 corresponds to a command represented in the audio data (e.g., by determining a domain of the command).

The audio data may then send the audio data to the selected speech-processing system 292. In some embodiments, the user device 110 further includes one or more applications 224 associated with one or more speech-processing systems 292. For example, a first application 224a may be associated with a first speech-processing system 292a, a second application 224b may be associated with a second speech-processing system 292a, and so on. An application 224 may be associated with more than one speech-processing system 292. In various embodiments, an application 224 receives, from the speech-processing system determination component 226, data identifying one or more speech-processing systems 292 and sends the audio data to the identified speech-processing system 292.

Various other configuration of the above-described components are within the scope of the present disclosure. For example, in FIG. 3B, two or more wakeword detectors 220a-220n may each process the output of the AFE 222 in parallel. As described above, the wakeword detectors 220 may each be models trained to recognize one or more wakewords. The speech-processing system determination component 226 may then process the outputs of the wakeword detectors 220, as described above, to select a speech-processing system 292. In another example, as shown in FIG. 3C, two or more wakeword detectors 220 may each receive data from their own AFEs 222.

FIGS. 4A and 4B are flow diagrams illustrating use of speech-processing systems according to embodiments of the present disclosure. Referring first to FIG. 4A, the user device 110 determines (402) that the audio data includes a first wakeword but then delays (404) selecting a speech-processing system 292 and/or sending the audio data to the speech-processing system 292 for a period of time (e.g., 500 milliseconds). In various embodiments, if the user first utters the first wakeword of a first speech processing system 292 but then realizes that the command should be processed by the second speech-processing system 292, the user utters the second wakeword of the second speech-processing system 292 within the period of time (e.g., soon after uttering the first wakeword).

If, during the period of time, the user device 110 determines (406) that the audio data also includes a representation of the second wakeword, the user device sends the audio data (408) to the second speech-processing system 292b. The second speech-processing system 292b may then further process the audio data, as described above, to determine and send response data (410) back to the user device 110 (and/or other device). The user device 110 may then cause output (412) corresponding to the response data.

Referring to FIG. 4B, the user device 110 may similarly determine (422) that the audio data includes a representation of the first wakeword. In some embodiments, the user device 110 then begins sending the audio data (424) to the first speech-processing system 292a. The first speech-processing system 292a may then begin processing the audio data. The user device 110 may, however, determine (426) that the audio data also includes a representation of the second wakeword. The user device 110 may therefore send a command to cease processing (428) the audio data to the first speech-processing system 292a, which may, in response to receipt of the command, cease processing the audio data. In some embodiments, the first speech-processing system may also, in response to receiving the command, delete (430) the audio data and/or other data, such as text data, derived from the audio data. The first speech-processing system may similarly delete metadata corresponding to the audio data, such as the identity (e.g., IP address) of the user device, the time of receipt of the audio data, and/or the duration of the audio data. The user device 110 instead or in addition send a second command requesting deletion of this data and/or metadata; the first speech-processing system may then perform this deletion upon receipt of the second command. As described above with reference to FIG. 4A, the user device 110 may send the audio data (432) to the second speech-processing system 292b, receive response data (434) in return, and cause output (436) corresponding to the response data.

In some embodiments, the user 5 may be proximate two or more user devices 110 that are configured to detect wakewords and to send audio data to one or more speech-processing systems 292. If a first user device 110a determines that first audio data includes a representation of the first and second wakewords and determines that the audio data corresponds to the second speech-processing system 292b, the first user device 110a may send, to one or more other user devices 110, data indicating that the first and second wakewords were detected and that the audio data corresponds to the second speech-processing system 292b. A second user device 110b may likewise send similar data to the first device 110a. This data may travel directly between the user devices 110, via the system 120, or by other routes. If, for example, the first user device 110a detects the first and second wakewords, but the second user device 110b detects only the first wakeword, the second user device 110b may send its corresponding audio data to the first speech-processing system 292a. If, however, the first user device 110a determines that the audio data corresponds to the second speech-processing system, and sends indication thereof to the second user device 110b, the second user device 110b does not (erroneously) send audio data to the first speech-processing system 292a.

In various embodiments, the user device 110 and/or remote system 120 may condition sending of data from a first speech-processing system to a second speech-processing system on a state of the user device 110. If the user device 110 is in a first state, and if the user device 110 and/or remote system 120 determines that a command represented in the audio data corresponds to a second state, the user device 110 and/or remote system 120 may first determine that the first state is different from the second state before sending, to a speech-processing system 292, a command corresponding to the second state. In other words, if the user device 110 is already in a state corresponding to the command, the user device 110 and/or remote system 120 determines that sending instructions to the speech-processing system to transition to the state is not necessary.

For example, the command may be, "Alexa, roll down my window." The user device 110 and/or remote system 120 may determine that the indicated window is already rolled down. A first speech-processing system associated with the uttered wakeword (e.g., Alexa) may thus not send a command (or other data, such as the audio data) to a second speech-processing system (e.g., SmartCar) associated with the command.

FIG. 5 illustrates how NLU processing may be performed on input text data. The NLU component 260 (such as the one depicted in FIG. 2) determines a semantic interpretation of text represented in text data. That is, the NLU component 260 determines the meaning behind the text represented in text data based on the individual words. The NLU component 260 interprets the text to derive an intent or a desired action of the user as well as the pertinent pieces of information in the text (e.g., entities) that allow a device (e.g., the user device 110, system 120, skill(s) 290, and/or skill system(s) 225) to complete that action.

The NLU component 260 may process text data to determine several hypotheses of a domain, intent, and/or entity corresponding to a single utterance. For example, if the ASR component 250 outputs ASR results including an N-best list of hypotheses, the NLU component 260 may process the text data with respect to all (or a portion of) the textual interpretations represented therein. The NLU component 260 may annotate text represented in text data by parsing and/or tagging the text. For example, for the text "tell me the weather for Seattle," the NLU component 260 may tag "tell me the weather for Seattle" as a command (e.g., to output weather information) as well as tag "Seattle" as a location for the weather information.

The NLU component 260 may include a shortlister component 550. The shortlister component 550 selects applications that may execute with respect to text data 610 input to the NLU component (e.g., applications that may execute the command). The shortlister component 550 thus limits downstream, more resource intensive NLU processes to being performed with respect to applications that may execute the command.

Without a shortlister component 550, the NLU component 260 may process a given hypothesis with respect to every application of the system, either in parallel, in series, or using some combination thereof. By including a shortlister component 550, the NLU component 260 may process a given hypothesis with respect to only the applications that may execute the command. This reduces total compute power and latency attributed to NLU processing.

The NLU component 260 may include one or more recognizers 563a-n. Each recognizer 563 may be associated with a different function, content source, and/or speech-processing system. The NLU component 260 may determine a function potentially associated with the command represented in text data input thereto in order to determine the proper recognizer 563 to process the hypothesis. The NLU component 260 may determine a command represented in text data is potentially associated with more than one function. Multiple recognizers 563 may be functionally linked (e.g., a telephony/communications recognizer and a calendaring recognizer may utilize data from the same contact list).

If the shortlister component 550 determines text corresponding to a hypothesis is potentially associated with multiple skills 290 and/or multiple speech-processing systems, the recognizers 563 associated with the skills 290 and/or multiple speech-processing systems (e.g., the recognizers 563 associated with the applications in the subset selected by the shortlister 550) may process the text. The selected recognizers 563 may process the text in parallel, in series, partially in parallel, etc. For example, if text corresponding to a hypothesis potentially implicates both a communications speech-processing system and a music speech-processing system, a recognizer associated with the communications speech-processing system may process the text in parallel, or partially in parallel, with a recognizer associated with the music application processing the text. The output generated by each recognizer 563 may be scored, with the overall highest scored output from all recognizers 563 ordinarily being selected to be the correct result.

The NLU component 260 may communicate with various storages to determine the potential speech-processing system(s) associated with a command represented in text data.

The NLU component 260 may communicate with an NLU storage 573, which includes databases of devices (574a-574n) identifying functions associated with specific devices. For example, the user device 110 may be associated with speech-processing systems for music, calendaring, contact lists, device-specific communications, etc. In addition, the NLU component 260 may communicate with an entity library 582, which includes database entries about specific services on a specific device, either indexed by device ID, user ID, or group user ID, or some other indicator.

Each recognizer 563 may include a named entity recognition (NER) component 562. The NER component 562 attempts to identify grammars and lexical information that may be used to construe meaning with respect to a command represented in text data input therein. The NER component 562 identifies portions of text represented in text data input into the NLU component 260 that correspond to a named entity that may be recognizable by the system. The NER component 562 (or other component of the NLU component 260) may also determine whether a word refers to an entity that is not explicitly mentioned in the utterance text, for example words such as "him," "her," or "it."

Each recognizer 563, and more specifically each NER component 562, may be associated with a particular grammar model 576, a particular set of intents 578, and a particular personalized lexicon 586. Each gazetteer 584 may include function-indexed lexical information associated with a particular user and/or device. For example, gazetteer A (584a) includes function-indexed lexicons 586aa to 586an. A user's music function lexical information might include album titles, artist names, and song names, for example, whereas a user's contact-list lexical information might include the names of contacts. Since every user's music collection and contact list is presumably different, this personalized information improves entity resolution.

An NER component 562 may apply grammar models 576 and/or lexicons 586 associated with the function (associated with the recognizer 563 implementing the NER component 562) to determine a mention one or more entities in text data input thereto. In this manner, the NER component 562 may identify "slots" (i.e., particular words in text data) that may be needed for later command processing. The NER component 562 may also label each slot with a type of varying levels of specificity (e.g., noun, place, city, artist name, song name, etc.).

Each grammar model 576 may include the names of entities (i.e., nouns) commonly found in text about the particular function to which the grammar model 576 relates, whereas the lexicon 586 is personalized to the user(s) and/or the user device 110 from which the input data or input text data originated. For example, a grammar model 576 associated with a shopping function may include a database of words commonly used when people discuss shopping.

A process called named entity resolution may link a portion of text to an entity known to the system. To perform this named entity resolution, the NLU component 260 may use gazetteer information (584a-584n) stored in an entity library storage 582. The gazetteer information 584 may be used to match text represented in text data with different entities, such as song titles, contact names, etc. Gazetteers may be linked to users (e.g., a particular gazetteer may be associated with a specific user's music collection), may be linked to certain function categories (e.g., shopping, music, video, communications, etc.), or may be organized in a variety of other ways.

Each recognizer 563 may also include an intent classification (IC) component 564. The IC component 564 parses text data to determine an intent(s) of the function associated with the recognizer 563 that potentially corresponds to the text data. An intent corresponds to an action to be performed that is responsive to the command represented by the text data. The IC component 564 may communicate with a database 578 of words linked to intents. For example, a music intent database may link words and phrases such as "quiet," "volume off," and "mute" to a "mute" intent. The IC component 564 identifies potential intents by comparing words in the text data to the words and phrases in an intents database 578 associated with the function that is associated with the recognizer 563 implementing the IC component 564.

The intents identifiable by a specific IC component 564 may be linked to function-specific (i.e., the function associated with the recognizer 563 implementing the IC component 564) grammar model 576 with "slots" to be filled. Each slot of a grammar model 576 may correspond to a portion of the text data that the system believes corresponds to an entity. For example, a grammar model 576 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar models 576 may not be structured as sentences, but rather based on associating slots with grammatical tags.

For example, an NER component 562 may parse text data to identify words as subject, object, verb, preposition, etc. based on grammar rules and/or models prior to recognizing named entities in the text data. An IC component 564 (implemented by the same recognizer 563 as the NER component 562) may use the identified verb to identify an intent. The NER component 562 may then determine a grammar model 576 associated with the identified intent. For example, a grammar model 576 for an intent corresponding to <PlayMusic> may specify a list of slots applicable to play the identified object and any object modifier (e.g., a prepositional phrase), such as {Artist Name}, {Album Name}, {Song name}, etc. The NER component 562 may then search corresponding fields in a lexicon 586 associated with the function associated with the recognizer 563 implementing the NER component 562 and may match words and phrases in the text data the NER component 562 previously tagged as a grammatical object or object modifier with those identified in the lexicon 586.

The NER component 562 may perform semantic tagging, which is the labeling of a word or combination of words according to their type/semantic meaning. The NER component 562 may parse text data using heuristic grammar rules, or a model may be constructed using techniques such as hidden Markov models, maximum entropy models, log linear models, conditional random fields (CRF), and the like. For example, an NER component 562 implemented by a music function recognizer 563 may parse and tag text corresponding to "play mother's little helper by the rolling stones" as {Verb}: "Play," {Object}: "mother's little helper," {Object Preposition}: "by," and {Object Modifier}: "the rolling stones." The NER component 562 may identify "Play" as a verb based on a word database associated with the music function, which an IC component 564 (which may also implemented by the music function recognizer 563) may determine that the word corresponds to a <PlayMusic> intent. At this stage, no determination may have been made as to the meaning of "mother's little helper" and "the rolling stones," but based on grammar rules and models, the NER component 562 may have determined that the text of these phrases relates to the grammatical object (i.e., entity) of the text data.

The frameworks linked to the intent may then be used to determine what database fields may be searched to determine the meaning of these phrases, such as searching a user's gazetteer 584 for similarity with the framework slots. For example, a framework for a <PlayMusic> intent might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 584 does not resolve a slot/field using gazetteer information, the NER component 562 may search, in the knowledge base 572, the database of generic words associated with the function. For example, if the text data includes text corresponding to "play songs by the rolling stones," after failing to determine an album name or song name called "songs" by "the rolling stones," the NER component 562 may search the function's vocabulary for the word "songs." In the some embodiments, generic words may be checked before the gazetteer information, or both may be tried, potentially producing two different results.

The NLU component 260 may tag text to attribute meaning to the text. For example, the NLU component 260 may tag "play mother's little helper by the rolling stones" as {intent}: <PlayMusic>, {artist name}: rolling stones, {media type}: SONG, and {song title}: mother's little helper. In another example, the NLU component 260 may tag "play songs by the rolling stones" as {intent}: <PlayMusic>, {artist name}: rolling stones, and {media type}: SONG.

The shortlister component 550 may receive text data 610 output from the ASR component 250 (as illustrated in FIG. 6). The ASR component 250 may embed the text data 610 into a form processable by a trained model(s) using sentence-embedding techniques. Sentence embedding may include, in the text data 610, text in a structure that enables the trained models of the shortlister component 550 to operate on the text. For example, an embedding of the text data 610 may be a vector representation of the text data.

The shortlister component 550 may make binary determinations (e.g., yes or no determinations) regarding which skill(s) 290 relate to the text data 610. The shortlister component 550 may make such determinations using the one or more trained models described herein above. If the shortlister component 550 implements a single trained model for each skill 290, the shortlister component 550 may simply run the models that are associated with enabled applications as indicated in a profile (e.g., profile 502) associated with the user device 110 and/or user that originated the command.

The shortlister component 550 may generate N-best list data representing applications that may execute with respect to the command represented in the text data 610. The size of the N-best list represented in the N-best list data is configurable. In an example, the N-best list data may indicate every application of the system as well as contain an indication, for each application, regarding whether the application is likely capable to execute the command represented in the text data 610. In another example, instead of indicating every application of the system, the N-best list data may only indicate all of the applications that are likely to be able to execute the command represented in the text data 610. In yet another example, the shortlister component 550 may implement thresholding such that the N-best list data may indicate no more than a maximum number of applications that may execute the command represented in the text data 610. In an example, the threshold number of applications that may be represented in the N-best list data is ten (10). In another example, the applications included in the N-best list data may be limited by a threshold a score, where only applications indicating a likelihood to handle the command is above a certain score (as determined by processing the text data 610 by the shortlister component 550 relative to such applications).

The NLU component 260 may compile data, output by each of the recognizers 563 that processed the text data input to the NLU component 260, into a single N-best list, and may send N-best list data 640 (representing the N-best list) to a pruning component 650 (as illustrated in FIG. 6). Each entry in the N-best list data 640 may correspond to tagged text output by a different recognizer 563. Each entry in the N-best list data 640 may be associated with a respective score indicating the tagged text corresponds to the function associated with the recognizer 563 from which the tagged text was output. For example, the N-best list data 640 may be represented as:

[0.95] Intent: <PlayMusic> Source: Alexa, SmartCar
[0.70] Intent: <RollWindow> Source: SmartCar
[0.01] Intent: <Navigate> Source: Alexa, SmartCar
[0.01] Intent: <PlayVideo> Source: Alexa The pruning component 650 creates a new, shorter N-best list (i.e., represented in N-best list data 660 discussed below) based on the N-best list data 640. The pruning component 650 may sort the tagged text represented in the N-best list data 640 according to their respective scores.

The pruning component 650 may perform score thresholding with respect to the N-best list data 640. For example, the pruning component 650 may select entries represented in the N-best list data 640 associated with a score satisfying (e.g., meeting and/or exceeding) a score threshold. The pruning component 650 may also or alternatively perform number of entry thresholding. For example, the pruning component 650 may select the top scoring entry(ies) associated with each different category of function (e.g., music, shopping, communications, etc.) represented in the N-best list data 640, with the new N-best list data 660 including a total number of entries meeting or falling below a threshold number of entries. The purpose of the pruning component 650 is to create a new list of top scoring entries so that downstream, more resource intensive processes may only operate on the tagged text entries that most likely correspond to the command input to the system.

The NLU component 260 may also include a light slot filler component 652. The light slot filler component 652 can take text from slots represented in the tagged text entry or entries output by the pruning component 650 and alter it to make the text more easily processed by downstream components. The light slot filler component 652 may perform low latency operations that do not involve heavy operations such as reference to a knowledge base. The purpose of the light slot filler component 652 is to replace words with other words or values that may be more easily understood by downstream components. For example, if a tagged text entry includes the word "tomorrow," the light slot filler component 652 may replace the word "tomorrow" with an actual date for purposes of downstream processing. Similarly, the light slot filler component 652 may replace the word "CD" with "album" or the words "compact disc." The replaced words are then included in the N-best list data 660.

The NLU component 260 sends the N-best list data 660 to an entity resolution component 670. The entity resolution component 670 can apply rules or other instructions to standardize labels or tokens from previous stages into an intent/slot representation. The precise transformation may depend on the function (e.g., for a travel function, the entity resolution component 670 may transform a text mention of "Boston airport" to the standard BOS three-letter code referring to the airport). The entity resolution component 670 can refer to an authority source (e.g., a knowledge base) that is used to specifically identify the precise entity referred to in each slot of each tagged text entry represented in the N-best list data 660. Specific intent/slot combinations may also be tied to a particular source, which may then be used to resolve the text. In the example "play songs by the stones," the entity resolution component 670 may reference a personal music catalog, Amazon Music account, user profile (described herein), or the like. The entity resolution component 670 may output data including an altered N-best list that is based on the N-best list represented in the N-best list data 660, but also includes more detailed information (e.g., entity IDs) about the specific entities mentioned in the slots and/or more detailed slot data that can eventually be used by a function. The NLU component 260 may include multiple entity resolution components 670 and each entity resolution component 670 may be specific to one or more functions.

The entity resolution component 670 may not be successful in resolving every entity and filling every slot represented in the N-best list data 660. This may result in the entity resolution component 670 outputting incomplete results. The NLU component 260 may include a final ranker component 690, which may consider such errors when determining how to rank the tagged text entries for potential execution. For example, if a book function recognizer 563 outputs a tagged text entry including a <ReadBook> intent flag, but the entity resolution component 670 cannot find a book with a title matching the text of the item, the final ranker component 690 may re-score that particular tagged text entry to be given a lower score. The final ranker component 690 may also assign a particular confidence to each tagged text entry input therein. The confidence score of a particular tagged text entry may be affected by whether the tagged text entry has unfilled slots. For example, if a tagged text entry associated with a first function includes slots that are all filled/resolved, that tagged text entry may be associated with a higher confidence than another tagged text entry including at least some slots that are unfilled/unresolved.

The final ranker component 690 may apply re-scoring, biasing, or other techniques to obtain the most preferred tagged and resolved text entry. To do so, the final ranker component 690 may consider not only the data output by the entity resolution component 670, but may also consider other data 691. The other data 691 may include a variety of information. For example, the other data 691 may include function rating or popularity data. For example, if one function has a particularly high rating, the final ranker component 690 may increase the score of a tagged text entry or entries associated with or otherwise invoking that particular function. The other data 691 may also include information about functions that have been specifically enabled by the user. For example, the final ranker component 690 may assign higher scores to tagged text entries associated with or otherwise invoking enabled functions than tagged text entries associated with or otherwise invoking non-enabled functions. User history may also be considered, such as if the user regularly uses a particular function or does so at particular times of day. Date, time, location, weather, type of user device 110, user ID, context, and other information may also be considered. For example, the final ranker component 690 may consider when any particular functions are currently active (e.g., music being played, a game being played, etc.). Following final ranking, the NLU component 260 may output NLU output data 685 to the orchestrator component 240. The NLU output data 685 may include various entries, with each entry representing an NLU processing confidence score, an intent, slot data, and a potential skill or skill that may operating with respect to the respective entry's data.

Following preliminary ranking, the NLU component 260 may output NLU results data 685. The NLU component 260 may send the NLU results data 685 to the orchestrator component 240. The NLU results data 685 may include first NLU results data 685*a* including tagged text associated with a first speech-processing system, second NLU results data 685*b* including tagged text associated with a second speech-processing system, etc. The NLU results data 685 may include tagged text data corresponding to the top scoring tagged text entries as determined by the preliminary ranker component 690.

The data 685 output from the NLU component 260 may include an N-best list of NLU results, where each item in the N-best list may correspond to a particular recognizer 563 and corresponding skill 290. Thus, for example, first NLU results of the N-best list may be associated with a first skill 290*a*, second NLU results of the N-best list may be associated with a second skill 290*b*, third NLU results of the N-best list may be associated with a third skill 290*c*, etc. Moreover, the first NLU results may correspond to text tagged to attribute meaning that enables the first skill 290*a* to execute with respect to the first NLU results, the second NLU results may correspond to text tagged to attribute meaning that enables the second skill 290*b* to execute with respect to the second NLU results, the third NLU results may correspond to text tagged to attribute meaning that enables the third skill 290*c* to execute with respect to the third NLU results, etc. The data 685 may also include scores corresponding to each item in the N-best list. Alternatively, the NLU result data 685 output to a particular skill 290 may include NER and IC data output by the particular skill's recognizer 563 while the NLU result data 685 output to the orchestrator component 240 may include only a portion of the NLU result data 685, for example the scores corresponding to certain skills.

The system may be configured with thousands, tens of thousands, etc. skills 290. The orchestrator component 240 enables the system to better determine the best skill 290 to execute the command input to the system. For example, first NLU results may correspond or substantially correspond to second NLU results, even though the first NLU results are operated on by a first skill 290*a* and the second NLU results are operated on by a second skill 290*b*. The first NLU results may be associated with a first confidence score indicating the system's confidence with respect to NLU processing performed to generate the first NLU results. Moreover, the second NLU results may be associated with a second confidence score indicating the system's confidence with respect to NLU processing performed to generate the second NLU results. The first confidence score may be similar or identical to the second confidence score since the first NLU results correspond or substantially correspond to the second NLU results. The first confidence score and/or the second confidence score may be a numeric value (e.g., from 0.0 to 1.0). Alternatively, the first confidence score and/or the second confidence score may be a binned value (e.g., low, medium, high).

The orchestrator component 240 may solicit the first skill 290*a* and the second skill 290*b* to provide potential result data based on the first NLU results and the second NLU results, respectively. For example, the orchestrator component 240 may send the first NLU results to the first skill 290*a* along with a request for the first skill 290*a* to at least partially execute a command with respect to the first NLU results. The orchestrator component 240 may also send the second NLU results to the second skill 290*b* along with a request for the second skill 290*b* to at least partially execute a command with respect to the first NLU results. The orchestrator component 240 receives, from the first skill 290*a*, first result data generated from the first skill's execution with respect to the first NLU results. The orchestrator component 240 also receives, from the second skill 290*b*, second results data generated from the second skill's execution with respect to the second NLU results.

The result data 630 may include various components. For example, the result data 630 may include content (e.g., audio data, text data, and/or video data) to be output to a user. The result data 630 may also include a unique identifier (ID) used by the remote system 120 and/or the skill server(s) 225 to locate the data to be output to a user. The result data 630 may also include an instruction. For example, if the command corresponds to "turn on the light," the result data 630 may include an instruction causing the system to turn on a light associated with a profile of the user device 110 and/or user.

The orchestrator component 240 may, prior to sending the NLU results data 685 to the orchestrator component 240, associate intents in the NLU results data 685 with skills 290. For example, if the NLU results data 685 includes a <PlayMusic> intent, the orchestrator component 240 may associate the NLU results data 685 with one or more skills 290 that can execute the <PlayMusic> intent. Thus, the orchestrator component 240 may send the NLU results data 685 paired with skills 290 to the orchestrator component 240. In response to input text data corresponding to "what should I do for dinner today," the orchestrator component 240 may generates pairs of skills 290 with associated intents corresponding to:

Skill 1/<Roll Down Window>
Skill 2/<Start Navigation>
Skill 3/<Play Music>

A system that does not use the orchestrator component 240 as described above may instead select the highest scored preliminary ranked NLU results data 685 associated with a single skill. The system may send the NLU results data 685 to the skill 290 along with a request for output data. In some situations, the skill 290 may not be able to provide the system with output data. This results in the system indicating to the user that the command could not be processed even though another skill associated with lower ranked NLU results data 685 could have provided output data responsive to the command.

Components of a system that may be used to perform unit selection, parametric TTS processing, and/or model-based audio synthesis are shown in FIG. 7. As shown in FIG. 7, the TTS component 280 may include a TTS front end 716, a speech synthesis engine 718, TTS unit storage 772, TTS parametric storage 780, and a TTS back end 734. The TTS unit storage 772 may include, among other things, voice inventories 778*a*-288*n* that may include pre-recorded audio segments (called units) to be used by the unit selection engine 730 when performing unit selection synthesis as described below. The TTS parametric storage 780 may include, among other things, parametric settings 768a-268n that may be used by the parametric synthesis engine 732 when performing parametric synthesis as described below. A particular set of parametric settings 768 may correspond to a particular voice profile (e.g., whispered speech, excited speech, etc.).

In various embodiments of the present invention, model-based synthesis of audio data may be performed using by a speech model 722 and a TTS front-end 716. The TTS front-end 716 may be the same as front ends used in traditional unit selection or parametric systems. In other embodiments, some or all of the components of the TTS front end 716 are based on other trained models. The present invention is not, however, limited to any particular type of TTS front end 716. The speech model 722 may be used to synthesize speech without requiring the TTS unit storage 772 or the TTS parametric storage 780, as described in greater detail below.

The TTS front end 716 transforms input text data 710 (from, for example, an application, user, device, or other text source) into a symbolic linguistic representation, which may include linguistic context features such as phoneme data, punctuation data, syllable-level features, word-level features, and/or emotion, speaker, accent, or other features for processing by the speech synthesis engine 718. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the input text data 710, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 716 may also process other input data 715, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the input text data 710 and/or the text for a TTS request may be accompanied by separate metadata indicating what text should be whispered (or have some other indicated audio characteristic). The speech synthesis engine 718 may compare the annotated phonetic units models and information stored in the TTS unit storage 772 and/or TTS parametric storage 780 for converting the input text into speech. The TTS front end 716 and speech synthesis engine 718 may include their own controller(s)/processor(s) and memory or they may use the controller/processor and memory of the server 120, device 110, or other device, for example. Similarly, the instructions for operating the TTS front end 716 and speech synthesis engine 718 may be located within the TTS component 280, within the memory and/or storage of the server 120, device 110, or within an external device.

Text data 710 input into the TTS component 280 may be sent to the TTS front end 716 for processing. The front-end may include components for performing text normalization, linguistic analysis, linguistic prosody generation, or other such components. During text normalization, the TTS front end 716 may first process the text input and generate standard text, converting such things as numbers, abbreviations (such as Apt., St., etc.), symbols ($, %, etc.) into the equivalent of written out words.

During linguistic analysis, the TTS front end 716 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS storage component 772. The linguistic analysis performed by the TTS front end 716 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 716 may then perform linguistic prosody generation where the phonetic units are annotated with desired prosodic characteristics, also called acoustic features, which indicate how the desired phonetic units are to be pronounced in the eventual output speech. During this stage the TTS front end 716 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 716, which may be referred to as a symbolic linguistic representation, may include a sequence of phonetic units annotated with prosodic characteristics. This symbolic linguistic representation may be sent to the speech synthesis engine 718, which may also be known as a synthesizer, for conversion into an audio waveform of speech for output to an audio output device and eventually to a user. The speech synthesis engine 718 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 718 may perform speech synthesis using one or more different methods. In one method of synthesis called unit selection, described further below, a unit selection engine 730 matches the symbolic linguistic representation created by the TTS front end 716 against a database of recorded speech, such as a database (e.g., TTS unit storage 772) storing information regarding one or more voice corpuses (e.g., voice inventories 778a-n). Each voice inventory may correspond to various segments of audio that was recorded by a speaking human, such as a voice actor, where the segments are stored in an individual inventory 778 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 730 may then use the information about each unit to select units to be joined together to form the speech output.

The unit selection engine 730 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 720) to form output audio data 212 representing synthesized speech. Using all the information in the unit database, a unit selection engine 730 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 732, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 720) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS storage 780 based on feedback of the results of TTS processing, thus enabling the TTS component 280 to improve speech recognition.

The TTS storage component 780 may be customized for an individual user based on his/her individualized desired speech output. In particular, the speech unit stored in a unit database may be taken from input audio data of the user speaking. For example, to create the customized speech output of the system, the system may be configured with multiple voice inventories 778a-278n, where each unit database is configured with a different "voice" to match desired speech qualities. Such voice inventories may also be linked to user accounts. The voice selected by the TTS component 280 to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 778 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 768) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 730 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 730. As part of unit selection, the unit selection engine 730 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 772 or in another storage component. For example, different unit selection databases may be stored in TTS unit storage 772. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 718 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 732 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 716.

The parametric synthesis engine 732 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 718, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 732 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 732 may lead to a number of potential audio output sequences. Based on the acoustic model and other potential models, the potential audio output sequences may be scored according to a confidence level of the parametric synthesis engine 732. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 768, which may represent acoustic settings matching a particular parametric "voice", may be used by the synthesis component 722 to ultimately create the output audio data 212.

When performing unit selection, after a unit is selected by the unit selection engine 730, the audio data corresponding to the unit may be passed to the audio data modification component 720. The audio data modification component 720 may then process the audio data of the unit to create modified audio data where the modified audio data reflects a desired audio quality. The audio data modification component 720 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 780. For each unit that corresponds to the selected portion, the audio data modification component 720 may process the audio data for that unit to create a modified unit audio data. The modified unit audio data may then be concatenated to form the output audio data 212. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 780. In that case, other output data 785 may be output along with the output audio data 212 so that an ultimate playback device (e.g., device 110) receives instructions for playback that can assist in creating the desired output audio. Thus, the other output data 785 may include instructions or other data indicating playback device settings (such as volume, playback rate, etc.) or other data indicating how output audio data including synthesized speech should be output. For example, for whispered speech, the output audio data 212 may include other output data 785 that may include a prosody tag or other indicator that instructs the device 110 to slow down the playback of the output audio data 212, thus making the ultimate audio sound more like whispered speech, which is typically slower than normal speech. In another example, the other output data 785 may include a volume tag that instructs the device 110 to output the speech at a volume level less than a current volume setting of the device 110, thus improving the quiet whisper effect.

As illustrated in FIG. 8, the user-recognition component 295 may include one or more subcomponents including a vision component 808, an audio component 810, a biometric component 812, a radio-frequency (RF) component 814, a machine-learning (ML) component 816, and a recognition confidence component 818. In some instances, the user-recognition component 295 may monitor data and determinations from one or more subcomponents to determine an identity of one or more users associated with data input to the system. The user-recognition component 295 may output user-recognition data 895, which may include a user identifier associated with a user the system believes is originating data input to the system. The user-recognition data 895 may be used to inform processes performed by the orchestrator 240 (or a subcomponent thereof) as described below.

The vision component 808 may receive data from one or more sensors capable of providing images (e.g., cameras) or sensors indicating motion (e.g., motion sensors). The vision component 808 can perform facial recognition or image analysis to determine an identity of a user and to associate that identity with a user profile associated with the user. In some instances, when a user is facing a camera, the vision component 808 may perform facial recognition and identify the user with a high degree of confidence. In other instances, the vision component 808 may have a low degree of confidence of an identity of a user, and the user-recognition component 295 may utilize determinations from additional components to determine an identity of a user. The vision component 808 can be used in conjunction with other components to determine an identity of a user. For example, the user-recognition component 295 may use data from the vision component 808 with data from the audio component 810 to identify what user's face appears to be speaking at the same time audio is captured by the user device 110 for purposes of identifying a user who spoke an input to the user device 110.

The user device 110 may include biometric sensors that transmit data to the biometric component 812. For example, the biometric component 812 may receive data corresponding to fingerprints, iris or retina scans, thermal scans, weights of users, a size of a user, pressure (e.g., within floor sensors), etc., and may determine a biometric profile corresponding to a user. The biometric component 812 may distinguish between a user and sound from a television, for example. Thus, the biometric component 812 may incorporate biometric information into a confidence level for determining an identity of a user.

The RF component 814 may use RF localization to track devices that a user may carry or wear. For example, a user may be associated with a device. The device may emit RF signals (e.g., Wi-Fi, Bluetooth®, etc.). The user device 110 may detect the signal and indicate to the RF component 814 the strength of the signal (e.g., as a received signal strength indication (RSSI)). The RF component 814 may use the RSSI to determine an identity of a user (with an associated confidence level). In some instances, the RF component 814 may determine that a received RF signal is associated with a mobile device that is associated with a particular user identifier.

In some instances, the user device 110 may include some RF or other detection processing capabilities so that a user who speaks an input may scan, tap, or otherwise acknowledge his/her personal device to the user device 110. In this manner, the user may "register" with the user device 110 for purposes of the user device 110 determining who spoke a particular input. Such a registration may occur prior to, during, or after speaking of an input.

The ML component 816 may track the behavior of various users as a factor in determining a confidence level of the identity of the user. For example, a user may adhere to a regular schedule such that the user is at a first location during the day (e.g., at work or at school). In this example, the ML component 816 factors in past behavior and/or trends into determining the identity of the user that provided input to the user device 110. Thus, the ML component 816 may use historical data and/or usage patterns over time to increase or decrease a confidence level of an identity of a user.

In some instances, the recognition confidence component 818 receives determinations from the various components 808, 810, 812, 814, and 816, and may determine a final confidence level associated with the identity of a user. The confidence level or other score data may be included in the user-recognition data 895.

The audio component 810 may receive data from one or more sensors capable of providing an audio signal (e.g., one or more microphones) to facilitate recognizing a user. The audio component 810 may perform audio recognition on an audio signal to determine an identity of the user and associated user identifier. In some instances, the audio component 810 may perform voice recognition to determine an identity of a user.

The audio component 810 may also perform user identification based on audio received by the user device 110. The audio component 810 may determine scores indicating whether speech in the audio originated from particular users. For example, a first score may indicate a likelihood that speech in the audio originated from a first user associated with a first user identifier, a second score may indicate a likelihood that speech in the audio originated from a second user associated with a second user identifier, etc. The audio component 810 may perform user recognition by comparing audio characteristics representing the audio to stored audio characteristics of users.

Figure 9:
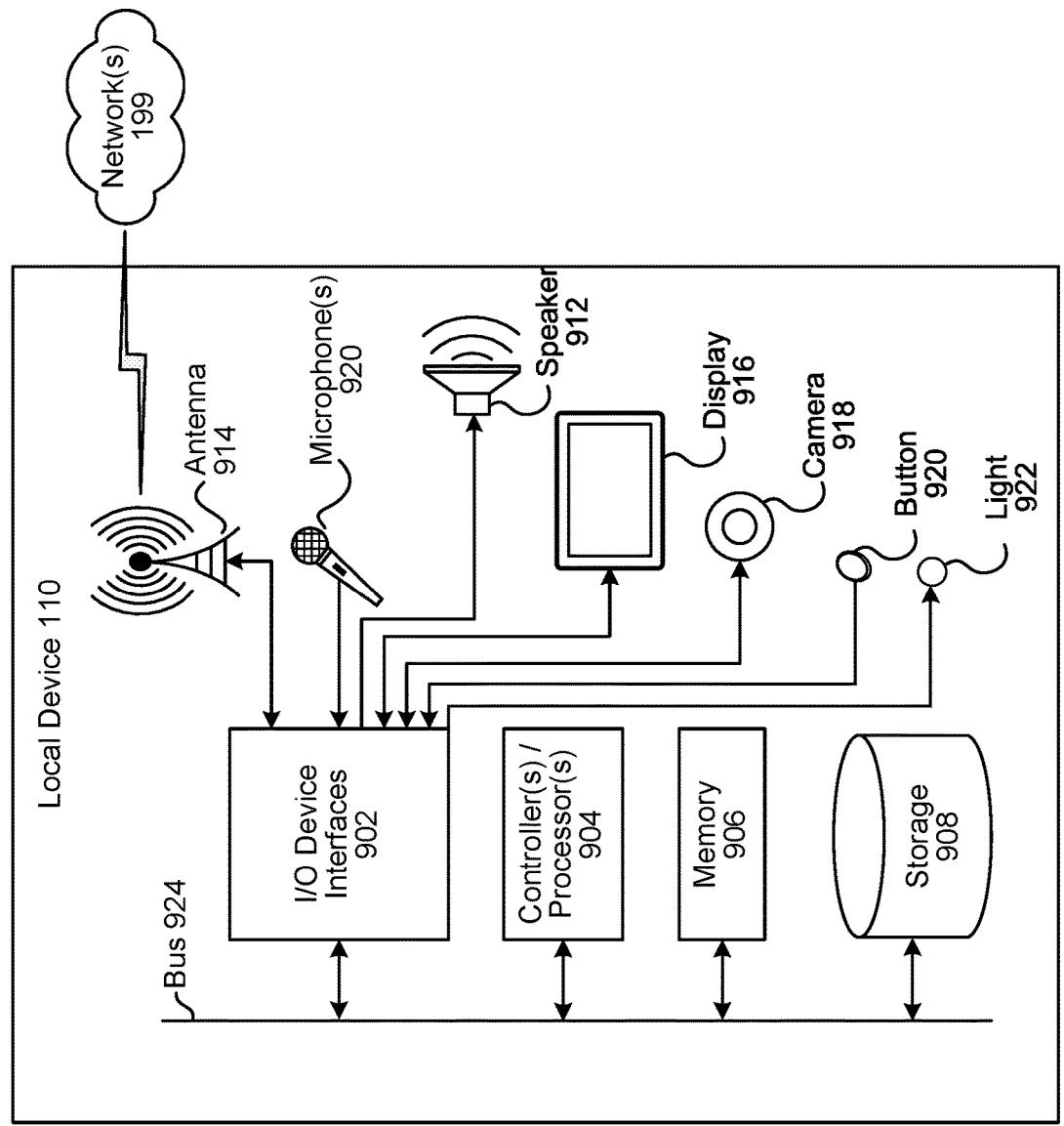
FIG. 9 illustrates example components of a user device according to embodiments of the present disclosure.
Figure 10:
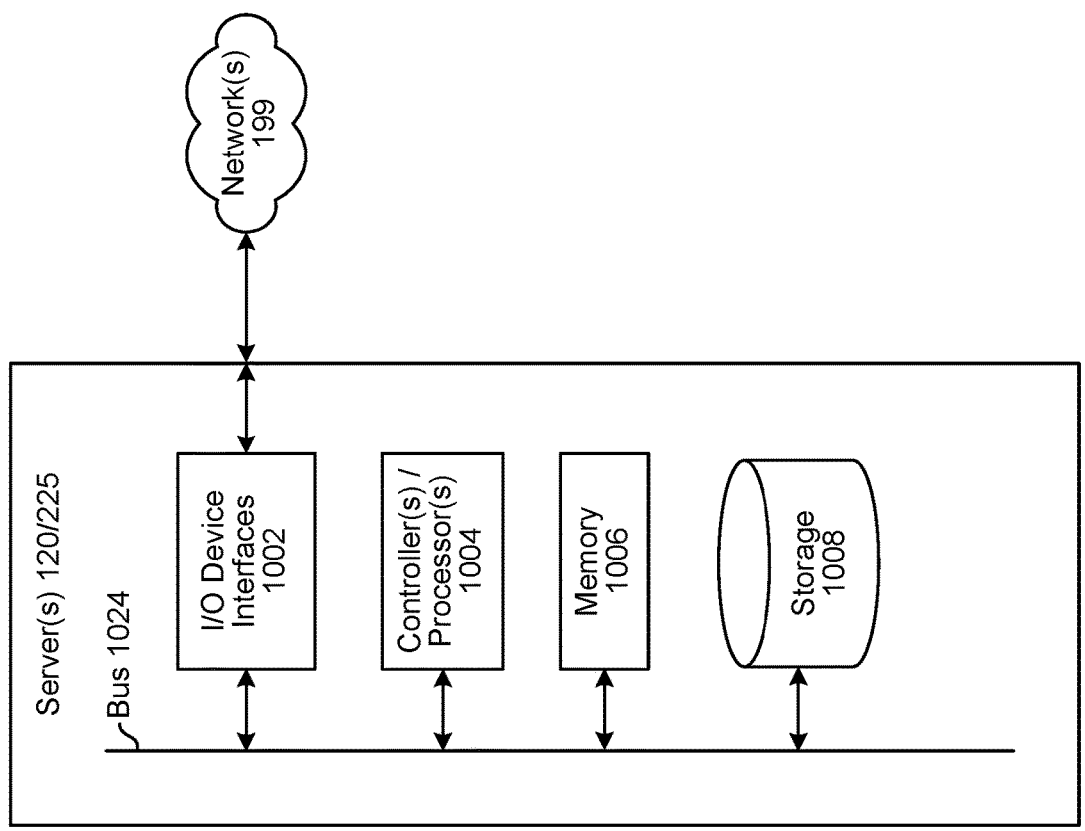
FIG. 10 illustrates example components of a remote system according to embodiments of the present disclosure.

FIG. 9 is a block diagram conceptually illustrating a user device 110 that may be used with the system. FIG. 10 is a block diagram conceptually illustrating example components of a remote device, such as the system(s) 120, which may assist with ASR processing, NLU processing, etc., and the skill system(s) 225. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/225) may be included in the system, such as one or more servers 120 for performing ASR processing, one or more servers 120 for performing NLU processing, one or more skill system(s) 225 for performing actions responsive to user inputs, etc. In operation, each of these devices (or groups of devices) may include computer-readable and computer-executable instructions that reside on the respective device (120/225), as will be discussed further below.

Each of these devices (110/120/225) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/225) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (902/1002).

Computer instructions for operating each device (110/120/225) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120/225) includes input/output device interfaces (902/1002). A variety of components may be connected through the input/output device interfaces (902/1002), as will be discussed further below. Additionally, each device (110/120/225) may include an address/data bus (924/1024) for conveying data among components of the respective device. Each component within a device (110/120/225) may also be directly connected to other components in addition to (or instead of) being connected to other components across the bus (924/1024).

Referring to FIG. 9, the user device 110 may include input/output device interfaces 902 that connect to a variety of components such as an audio output component such as a speaker 912, a wired headset or a wireless headset (not illustrated), or other component capable of outputting audio. The user device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 916 for displaying content. The user device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O interfaces (902/1002), processor(s) (904/1004), memory (906/1006), and/or storage (908/1008) of the device(s) 110 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the user device 110, the system(s) 120, and the skill system(s) 225, as described herein, are illustrative, and may be located as a stand-alone device or may be included, in whole or in part, as a component of a larger device or system.

Figure 11:
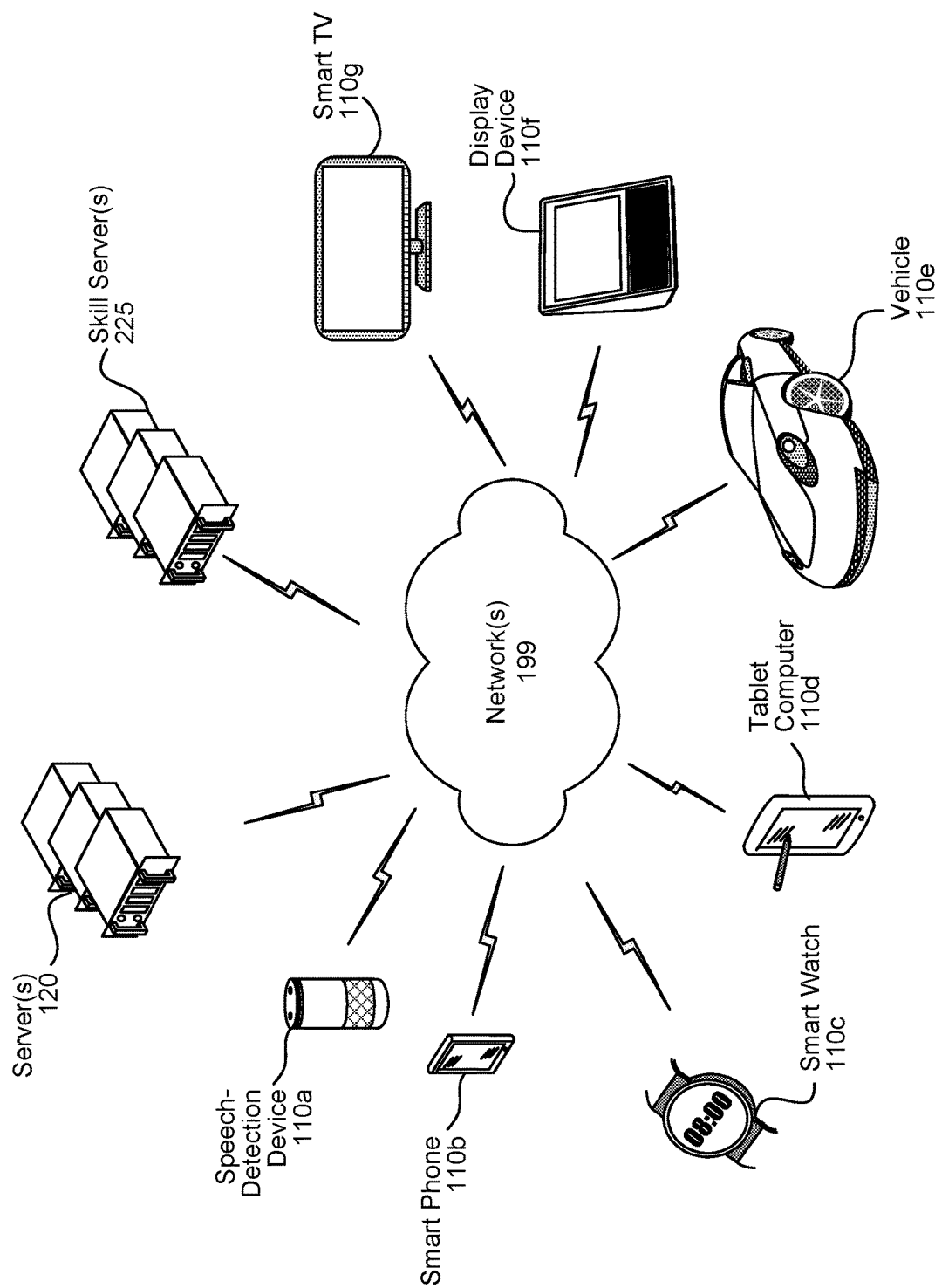
FIG. 11 illustrates an example of a computer network for use with a speech-processing system.

As illustrated in FIG. 11, multiple devices (110a-110g, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a vehicle 110a, a smart phone 110b, a smart watch 110c, a tablet computer 110d, a vehicle 110e, a display vehicle 110f, and/or a smart television 110g may be connected to the network(s) 199 through a wireless service provider, over a Wi-Fi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc., of one or more servers 120.

The concepts disclosed herein may be applied within a number of different devices and computer systems, including, for example, general-purpose computing systems, speech-processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method for processing data representing a spoken command, the method comprising:
   receiving, at a voice-controlled device, first audio data representing a first portion of an utterance;
   determining that the first audio data includes a representation of a first wakeword corresponding to a first speech-processing system;
   sending, to the first speech-processing system, first data corresponding to the first audio data;
   after receiving the first audio data, receiving, at the voice-controlled device, second audio data representing a second portion of the utterance;
   determining that the second audio data includes a representation of a second wakeword corresponding to a second speech-processing system;
   sending, to the second speech-processing system, second data corresponding to the second audio data;
   sending, to the first speech-processing system, third data corresponding to a command to cease processing with regard to the first audio data;
   receiving, from the second speech-processing system, fourth data corresponding to a response to the second portion of the utterance; and
   causing output corresponding to the fourth data.

2. The method of claim 1, further comprising:
   sending, to a trained model, the first audio data and the second audio data;
   determining, using the trained model, that the second audio data includes a representation of the second wakeword; and
   prior to causing the output, processing, using the trained model, the first audio data and the second audio data to determine that the utterance corresponds to the second speech-processing system.

3. The method of claim 1, further comprising:
   determining that the voice-controlled device corresponds to a first state of first output audio;
   determining that the utterance corresponds to a request to change from the first state to a second state of the voice-controlled device, the second state being different from the first state; and
   after determining that the utterance corresponds to the request, sending, to the first speech-processing system, fifth data corresponding to a second command to output the second audio data.

4. A computer-implemented method comprising:
   receiving, at a device, audio data corresponding to an utterance;
   determining that a first portion of the audio data includes a first representation of a first wakeword corresponding to a first speech-processing system;
   determining that a second portion of the audio data includes a second representation of a second wakeword corresponding to a second speech-processing system;
   determining that the audio data corresponds to the second speech-processing system;

sending, to the second speech-processing system, first data corresponding to the audio data;

receiving, from the second speech-processing system, second data corresponding to a response to the utterance; and causing output, at the device, corresponding to the second data.

5. The computer-implemented method of claim 4, wherein determining that the audio data corresponds to the second speech-processing system comprises:

determining that the first representation appears in the audio data after the second representation.

6. The computer-implemented method of claim 4, wherein determining that the audio data corresponds to the second speech-processing system comprises:

receiving, from a first wakeword component at a first time, a first indication that the audio data includes the first representation;

receiving, from a second wakeword component at a second time, a second indication that the audio data includes the second representation; and determining that the second time is later than the first time.

7. The computer-implemented method of claim 4, wherein determining that the audio data corresponds to the second speech-processing system comprises:

determining text data corresponding to the first data;

processing the text data using a model; and receiving, from the model, an indication of the second speech-processing system.

8. The computer-implemented method of claim 4, wherein determining that the audio data corresponds to the second speech-processing system comprises:

determining that a third portion of the audio data includes a third representation of a word; and determining that the third representation is unassociated with the first speech-processing system.

9. The computer-implemented method of claim 4, wherein determining that the audio data corresponds to the second speech-processing system comprises:

determining text data corresponding to the first data;

determining that the text data includes a representation of a command; and determining that the second speech-processing system is capable of processing the command.

10. The computer-implemented method of claim 9, further comprising:

after determining that the first portion of the audio data includes the first representation, sending, to the first speech-processing system, third data corresponding to the audio data; and after determining that the audio data corresponds to the second speech-processing system, sending, to the first speech-processing system, fourth data corresponding to a second command to cease processing with regard to the third data.

11. The computer-implemented method of claim 4, further comprising:

receiving, at a second device, second audio data corresponding to the utterance;

determining, by the second device, that the second audio data includes a third representation of the first wakeword; and receiving, at the second device, third data corresponding to a command to cease processing with regard to the second audio data.

12. The computer-implemented method of claim 4, further comprising:

receiving, at the device, second audio data corresponding to a second utterance;

sending, to the second speech-processing system, third data corresponding to the second audio data;

determining, by the second speech-processing system, that the second utterance corresponds to the first speech-processing system; and sending, to the first speech-processing system, the third data.

13. A computing device comprising:

at least one processor; and at least one memory including instructions that, when executed by the at least one processor, cause the computing device to:

receive, at a device, audio data corresponding to an utterance;

determine that a first portion of the audio data includes a first representation of a first wakeword corresponding to a first speech-processing system;

determine that a second portion of the audio data includes a second representation of a second wakeword corresponding to a second speech-processing system;

determine that the audio data corresponds to the second speech-processing system;

send, to the second speech-processing system, first data corresponding to the audio data;

receive, from the second speech-processing system, second data corresponding to a response to the utterance; and cause output, at the device, corresponding to the second data.

14. The computing device of claim 13, wherein the at least one memory further includes instructions to determine that the audio data corresponds to the second speech-processing system that, when executed by the at least one processor, further cause the computing device to:

determine that the first representation appears in the audio data after the second representation.

15. The computing device of claim 13, wherein the at least one memory further includes instructions to determine that the audio data corresponds to the second speech-processing system that, when executed by the at least one processor, further cause the computing device to:

receive, from a first wakeword component at a first time, a first indication that the audio data includes the first representation;

receive, from a second wakeword component at a second time, a second indication that the audio data includes the second representation; and determine that the second time is later than the first time.

16. The computing device of claim 13, wherein the at least one memory further includes instructions to determine that the audio data corresponds to the second speech-processing system that, when executed by the at least one processor, further cause the computing device to:

determine text data corresponding to the first data;

process the text data using a model; and receive, from the model, an indication of the second speech-processing system.

17. The computing device of claim 13, wherein the at least one memory further includes instructions to determine that the audio data corresponds to the second speech-processing system that, when executed by the at least one processor, further cause the computing device to:
- determine that a third portion of the audio data includes a third representation of a word; and
- determine that the third representation is unassociated with the first speech-processing system.

18. The computing device of claim 13, wherein the at least one memory further includes instructions to determine that the audio data corresponds to the second speech-processing system that, when executed by the at least one processor, further cause the computing device to:
- determine text data corresponding to the first data;
- determine that the text data includes a representation of a command; and
- determine that the second speech-processing system is capable of processing the command.

19. The computing device of claim 18, wherein the at least one memory further includes instructions that, when executed by the at least one processor, further cause the computing device to:
- after determination that the first portion of the audio data includes the first representation, send, to the first speech-processing system, third data corresponding to the audio data; and
- after determination that the audio data corresponds to the second speech-processing system, send, to the first speech-processing system, fourth data corresponding to a second command to cease processing with regard to the third data.

20. The computing device of claim 13, wherein the at least one memory further includes instructions that, when executed by the at least one processor, further cause the computing device to:
- receive, at a second device, second audio data corresponding to the utterance;
- determine, by the second device, that the second audio data includes a third representation of the first wakeword; and
- receive, at the second device, third data corresponding to a command to cease processing with regard to the second audio data.

* * * * *